US006438611B1

(12) United States Patent
Hara et al.

(10) Patent No.: US 6,438,611 B1

(45) Date of Patent: Aug. 20, 2002

(54) NETWORK SYSTEM FOR ENSEMBLE PERFORMANCE BY REMOTE TERMINALS

(75) Inventors: Masaki Hara, Tokyo; Shiburo Tokano, Hamamatsu, both of (JP)

(73) Assignee: Yamaha Corporation, Hamamatsu (JP)

(*) Notice: Subject to any disclaimer, the term of this patent is extended or adjusted under 35 U.S.C. 154(b) by 0 days.

(21) Appl. No.: 09/239,424

(22) Filed: Jan. 28, 1999

(30) Foreign Application Priority Data

Jan. 29, 1998 (JP) ........................................... 10-030419

(51) Int. Cl.[7] ................................................ G06F 15/16

(52) U.S. Cl. ........................ 709/248; 709/201; 709/203; 709/205; 709/244

(58) Field of Search ................................ 709/205, 201, 709/203, 244, 248; 84/470; 380/4

(56) References Cited

U.S. PATENT DOCUMENTS

| | | | | | |
|---|---|---|---|---|---|
| 5,339,388 | A | * | 8/1994 | Bates et al. | 395/331 |
| 5,590,282 | A | * | 12/1996 | Clynes | 709/219 |
| 5,760,323 | A | * | 6/1998 | Romero et al. | 84/470 R |
| 5,872,924 | A | * | 2/1999 | Nakayama et al. | 709/205 |
| 5,883,957 | A | * | 3/1999 | Moline et al. | 380/4 |
| 5,892,171 | A | * | 4/1999 | Ide | 84/622 |
| 6,061,717 | A | * | 5/2000 | Carleton et al. | 709/205 |
| 6,066,795 | A | * | 5/2000 | Hara | 84/645 |
| 6,211,451 | B1 | * | 4/2001 | Tohgi et al. | 84/470 R |

* cited by examiner

*Primary Examiner*—Saleh Najjar

(74) *Attorney, Agent, or Firm*—Morrison & Foerster LLP

(57) ABSTRACT

In a network performance system involving a plurality of performance apparatuses, each performance apparatus stores phrase performance information of a plurality of performance parts, and each performance apparatus is allocated with one of the performance parts to conduct an ensemble performance composed of the plurality of the performance parts. A server apparatus is connected to each of the performance apparatuses via a network. Each of the performance apparatuses is manually operable to input operational information relating to the performance part allocated thereto, and transmits the inputted operational information to the server apparatus via the network. The server apparatus delivers the operational information transmitted by each of the performance apparatuses to other of the performance apparatuses via the network. Each of the performance apparatuses receives the operational information relating to other performance parts allocated to other of the performance apparatuses from the server apparatus via the network, and reproduces the phrase performance information of the performance part allocated thereto in response to the inputted operational information and concurrently reproduces the phrase information of other performance parts allocated to other of the performance apparatuses in response to the received operational information to thereby conduct the ensemble performance composed of the plurality of the performance parts.

16 Claims, 19 Drawing Sheets

FIG.3

41

| KEY POSITION | PHRASE NO. | PART NO. |
|---|---|---|
| A | 1 | 1 |
| S | 2 | 1 |
| D | 3 | 1 |
| F | 4 | 1 |
| • • • | • • • | |
| J | 7 | 2 |
| K | 8 | 2 |
| L | 9 | 2 |
| ; | 10 | 2 |

42

| |
|---|
| PHRASE NO.1 |
| PHRASE PERFORMANCE INFORMATION |
| PHRASE NO.2 |
| PHRASE PERFORMANCE INFORMATION |
| PHRASE NO.3 |
| PHRASE PERFORMANCE INFORMATION |
| PHRASE NO.4 |
| PHRASE PERFORMANCE INFORMATION |
| PHRASE NO.5 |
| PHRASE PERFORMANCE INFORMATION |

43

| PART NO. | NETWORK ADDRESS OF USER |
|---|---|
| 1 | • • • • • • |
| 2 | • • • • • • |
| 3 | • • • • • • |
| | |

44

| PART NO. | TEMPO INFORMATION |
|---|---|
| 1 | • • • • • • |
| 2 | • • • • • • |
| 3 | • • • • • • |
| | |

NETWORK SYSTEM FOR ENSEMBLE PERFORMANCE BY REMOTE TERMINALS

BACKGROUND OF THE INVENTION

1. Field of the Invention

The present invention relates to a network performance system whereby a performance is given by allocating performance parts to a plurality of network performance apparatuses connected to a network, a network performance apparatus used in this network performance system, and a machine readable medium for storing network performance programs.

2. Description of the Related Art

Events involving a plurality of users participating by means of a network, such as the Internet, are becoming popular. In the field of musical performance, it is conceivable that a band performance or ensemble performance can be conducted from a plurality of terminals by means of network. To achieve this, a system may be conceived whereby performance information corresponding to an electronic instrument performance is transmitted in real time to other terminals connected to a network, and at the other terminals, music corresponding to the received performance information is reproduced.

In this case, it is possible to use MIDI data as the performance information transmitted and received between terminals. If each terminal is set to a different MIDI channel and each terminal is able to receive all MIDI channels, it is possible to give a band performance via a network between a plurality of terminals. Since the performance information transmitted and received is MIDI data, only a small transmission capacity is required compared to transmission of waveform data.

However, depending on the network used, delays may occur if the transmission capacity is insufficient, and in some cases, delays may occur in transmission and data errors may occur. Furthermore, it is also necessary to set the correct MIDI channel for each terminal. If incorrect channel settings are made for the terminals, then the wrong music will be reproduced at each terminal. Moreover, if a situation arises where another terminal incorrectly plays the same performance part as a particular user's terminal, then it becomes difficult for the user in question to concentrate on his or her own part and there is a risk that that user's performance will be disturbed by the performance of the same part at the other terminal. However, the task of setting channels is difficult for a beginner, and it is complicated even for an experienced person. Also, when users located in separate places give a band performance via a network, it is necessary to assign a band master function to one of terminals.

SUMMARY OF THE INVENTION

The present invention is devised in view of the foregoing problems, an object thereof being to provide a network performance system, network performance apparatus and machine readable medium for storing network performance programs, whereby a band performance or ensemble performance involving a plurality of parts can be conducted among a plurality of apparatuses by means of a network in a simple manner.

According to the first aspect of the present invention, a network performance system comprises a plurality of performance apparatuses each storing phrase performance information of a plurality of performance parts and each being allocated with one of the performance parts to conduct an ensemble performance composed of the plurality of the performance parts, and a server apparatus connected to each of the performance apparatuses via a network. Each of the performance apparatuses is manually operable to input operational information relating to the performance part allocated thereto, and transmits the inputted operational information to the server apparatus via the network. The server apparatus delivers the operational information transmitted by each of the performance apparatuses to other of the performance apparatuses via the network. Each of the performance apparatuses receives the operational information relating to other performance parts allocated to other of the performance apparatuses from the server apparatus via the network, and reproduces the phrase performance information of the performance part allocated thereto in response to the inputted operational information and concurrently reproduces the phrase information of other performance parts allocated to other of the performance apparatuses in response to the received operational information to thereby conduct the ensemble performance composed of the plurality of the performance parts.

Therefore, the ensemble or band performance of a plurality of parts can be conducted between a plurality of performance apparatuses via a network. Since the information transmitted and received is operational information, it is possible to reduce the amount of information compared to the phrase performance information which is read out for performance output. Moreover, since the server apparatus conducts delivery of the performance information, the processing load on the network performance apparatuses for the purpose of communications is reduced.

According to the second aspect of the present invention, a performance apparatus is allocated with one of a plurality of performance parts and stores phrase performance information of the plurality of the performance parts to conduct an ensemble performance composed of the plurality of the performance parts in communication with other performance apparatus through a network. The performance apparatus comprises an input device that is manually operable to input operational information relating to the performance part allocated to the performance apparatus, a receiver device that receives operational information being inputted by other performance apparatus and relating to other performance part allocated to other performance apparatus via the network, and a sound device that reproduces the phrase performance information of the performance part allocated to the performance apparatus in response to the inputted operational information and that concurrently reproduces the phrase information of other performance part allocated to other performance apparatus in response to the received operational information to thereby conduct the ensemble performance composed of the plurality of the performance parts.

Therefore, a band performance of a plurality of parts can be conducted between a plurality of apparatuses via a network. Since the information transmitted and received is operational information, it is possible to reduce the amount of information compared to phrase performance information which is read out for performance output.

According to the third aspect of the invention, a performance apparatus is allocated with one of a plurality of performance parts and stores phrase performance information of the plurality of the performance parts to conduct an ensemble performance composed of the plurality of the performance parts in communication with other performance apparatus through a network. The performance apparatus comprises an input device that is manually operable to input operational information, a control device that operates when the inputted operational information is adequately relating to the allocated performance part for transmitting the inputted operational information to other performance apparatus via the network so as to conduct the ensemble performance in other performance apparatus, and that operates when the inputted operational information is inadvertently relating to other performance part allocated to other performance apparatus for prohibiting transmission of the inputted operational information, and a sound device that reproduces the phrase performance information of the allocated performance part in response to the inputted operational information when the inputted operational information is adequately relating to the allocated performance part, the sound device prohibiting reproduction of the phrase performance information when the inputted operational information is inadvertently relating to other performance part allocated to other performance apparatus.

Therefore, a band performance of a plurality of parts can be conducted between a plurality of apparatuses via a network. It is possible to readily identify which performance part an input operation relates to. Furthermore, no problems occur if an input operation relating to a performance part other than the allocated part is mistakenly implemented.

According to the fourth aspect of the present invention, a performance apparatus is designated as either of a master and a member and is allocated with one of a plurality of performance parts to conduct an ensemble performance in communication via a network with other performance apparatus allocated with other of the plurality of the performance parts under initiative by the master. The performance apparatus comprises an input device that has a first operator manually operable to input operational information effective to execute the allocated performance part, and a second operator assigned with a special function and being manually operable to input information effective to initiate the ensemble performance, and a control device that operates when the performance apparatus is designated as the master for enabling the second operator so as to input the command information and to transmit the inputted command information to other performance apparatus via the network to initiate other performance apparatus, and that operates when the performance apparatus is designated as the member for disabling the second operator so as to prohibit inputting of the command information.

Therefore, a band performance of a plurality of parts can be conducted between a plurality of apparatuses via a network. Since only the master can operate special functions, organisation or conduct of the band performance is simplified. Moreover, since the special functions cannot be operated if a apparatus is set as a member other than the master, no problems arise if the special functions are mistakenly operated.

According to the fifth aspect of the present invention, a machine readable medium is for use in a computer machine being allocated with one of a plurality of performance parts and storing phrase performance information of the plurality of the performance parts to conduct an ensemble performance composed of the plurality of the performance parts in communication with other computer machine through a network. The machine readable medium contains a program executable by the computer machine to carry out an ensemble performance process comprising the steps of inputting operational information relating to the performance part allocated to the computer machine, receiving operational information being inputted by other computer machine and relating to other performance part allocated to other computer machine via the network, reproducing the phrase performance information of the performance part allocated to the computer machine in response to the inputted operational information, and concurrently reproducing the phrase information of other performance part allocated to other computer machine in response to the received operational information to thereby conduct the ensemble performance composed of the plurality of the performance parts.

Therefore, it is possible to provide a program for implementing an action similar to the second aspect of the invention.

According to the sixth aspect of the present invention, a machine readable medium is for use in a computer machine being allocated with one of a plurality of performance parts and storing phrase performance information of the plurality of the performance parts to conduct an ensemble performance composed of the plurality of the performance parts in communication with other computer machine allocated with other performance part through a network. The machine readable medium contains a program executable by the computer machine for carrying out an ensemble performance process comprising the steps of inputting operational information, transmitting the inputted operational information to other computer machine via the network when the inputted operational information is adequately relating to the allocated performance part so as to conduct the ensemble performance at other performance apparatus, prohibiting transmission of the inputted operational information when the inputted operational information is inadvertently relating to other performance part allocated to other computer machine, reproducing the phrase performance information of the allocated performance part in response to the inputted operational information when the inputted operational information is adequately relating to the allocated performance part in the ensemble performance at the computer machine, and prohibiting reproduction of the phrase performance information when the inputted operational information is inadvertently relating to other performance part allocated to other computer machine.

Therefore, it is possible to provide a program for implementing an action similar to the third aspect of the invention.

According to the seventh aspect of the present invention, a machine readable medium is for use in a computer machine designated as either of a master and a member and being allocated with one of a plurality of performance parts to conduct an ensemble performance in communication via a network with other computer machine allocated with other of the plurality of the performance parts under initiative by the master. The machine readable medium contains a program executable by the computer machine to carry out an ensemble performance process comprising the steps of configuring an input device to provide a first operator operable to input operational information effective to execute the allocated performance part and to provide a second operator allocated with a special function and being operable to input information effective to initiate the ensemble performance, enabling the second operator when the computer machine is designated as the master so as to input the command information and so as to transmit the inputted command information to other computer machine via the network to initiate other computer machine, and disabling the second operator when the computer machine is designated as the member so as to prohibit inputting of the command information.

Therefore, it is possible to provide a program for implementing an action similar to the fourth aspect of the invention.

BRIEF DESCRIPTION OF THE DRAWINGS

FIG. 3 is an illustrative diagram of stored information in an embodiment of a network performance apparatus according to the present invention;

DESCRIPTION OF THE PREFERRED EMBODIMENTS

Figure 1:
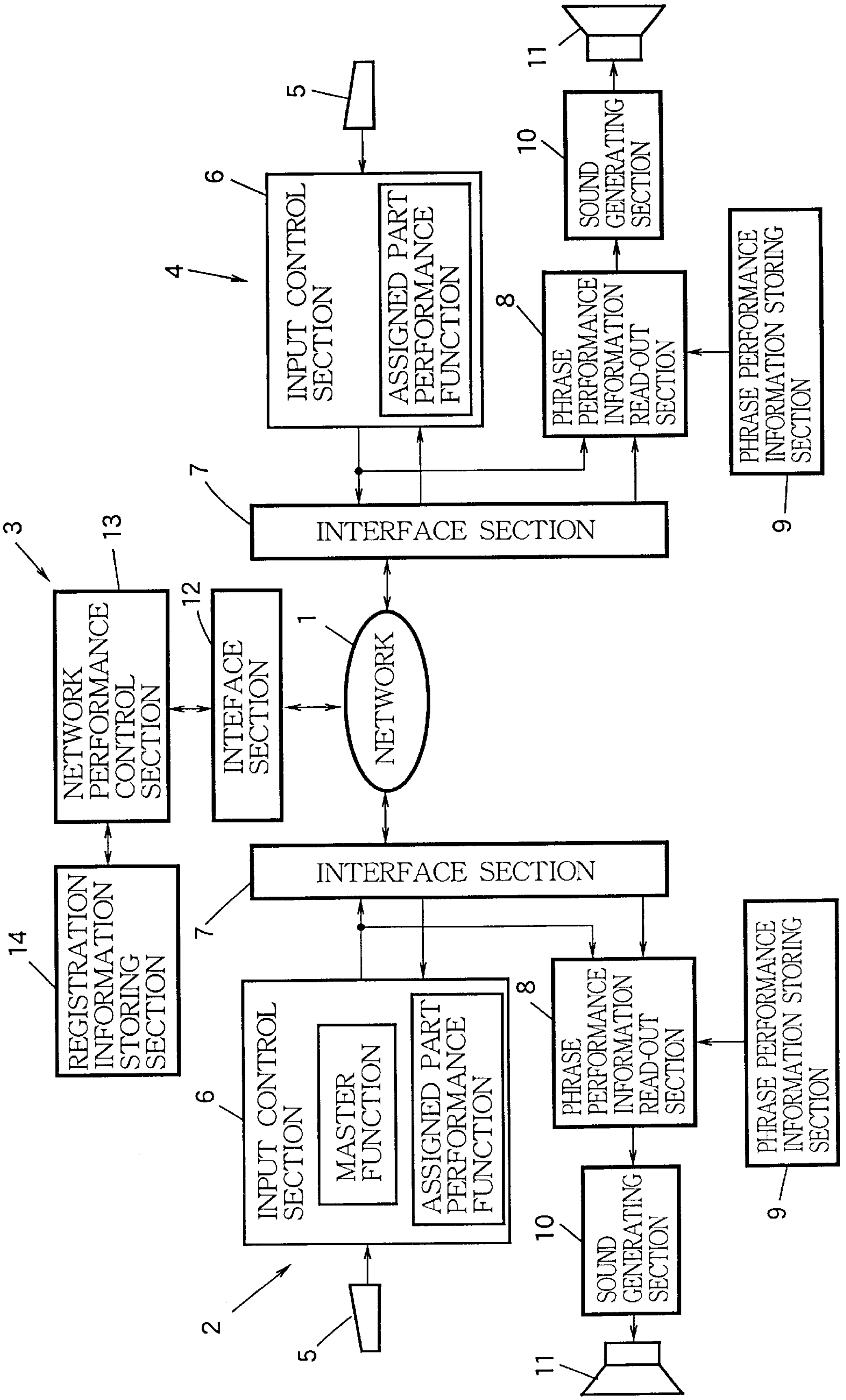
FIG. 1 is a general compositional view of an embodiment of a network performance system and network performance apparatuses according to the present invention.

FIG. 1 is a general compositional view of one embodiment of a network performance system and a network performance apparatus according to the present invention. In the drawings, 1 is a network, 2 is a master terminal, 3 is a server, 4 is a member terminal, 5 is an operating section, 6 is an input control section, 7 is an interface section, 8 is a phrase performance information read-out section, 9 is a phrase performance information storing section, 10 is a sound generating section, 11 is a speaker, 12 is an interface section, 13 is a network performance control section, and 14 is a registration information storing section.

A master terminal 2, server 3, and at least one member terminal 4 are connected to the network 1, and these terminals form a plurality of network performance apparatuses, thereby constituting a network performance system. Performance parts to be input are allocated individually to the master terminal 2 and member terminals 4. All of the terminals are similar in hardware terms, and have different functions depending on their software settings. All of the terminals are provided with an operating section 5, such as a keyboard, mouse pointer, or the like, which is connected to a input control section 6. The input control section 6 is connected to an interface section 7 and a phrase performance information read-out section 8. The input control section 6 transmits operational information corresponding to operational input from the operating section 5 of the terminal in question to a server 3 via a communications interface section 7 and the network 1. Furthermore, the input control section 6 receives control information from the server 3 via the network 1 and the interface section 7.

The phrase performance information read-out section 8 receives operational information for the performance part of the terminal in question from the input control section 6, and it also receives, via the communications interface section 7, operational information for the performance parts of the other terminals input by the other terminals and transmitted via the network 1, server 3 and interface section 12. The phrase performance information read-out section 8 activates a phrase performance information read-out function, each time there is an input of operational information relating to the performance part of the terminal in question and operational information relating to the performance parts of the other terminals. Phrase performance information corresponding to the operational information relating to the performance part of the terminal in question and operational information relating to the performance parts of the other terminals are read out from the phrase performance information memory section 9 and are output in real time to the sound generating section 10. The sound generating section 10 inputs the phrase performance information, generates sound waveforms having a prescribed tone quality, and outputs the sound waveforms to the speaker 11 via an amplifier, which is omitted from the drawings.

The server 3, on the other hand, is provided with a network performance control section 13, an interface section 12, and a registration information storing section 14. The network performance control section 13 registers settings for designating one of the plurality of terminals connected to the network 1 as a master terminal 2, and designating one or a plurality of terminals as member terminals 4. Thereupon, a master function is assigned to the master terminal 2, whilst performance parts are designated to the master terminal 2 and the one or several member terminals 4. During a network performance, the master terminal 2 has the function of receiving the operational information transmitted from any one terminal and distributing it to the other terminals. The set registration information is stored in the registration information storing section 14.

When the master function is assigned to the master terminal 2 by the network performance control section 13 of the server 3, it becomes possible for the master terminal 2 to designate the performance parts at the master terminal and at the member terminals 4, via the operating section 5. The designated performance parts are registered in the registration information storing section 14 of the server 3, and the network performance control section 13 of the server 3 designates functions corresponding to the respective performance parts to the master terminal 2 and member terminals 4. When the performance parts have been designated to the input control sections 6 of the master terminal 2 and the member terminals 4, the input control section 6 of each terminal will then only accept input for its designated performance part from the operating section 5, and it will not be possible to input operational information for other performance parts. In specific terms, each terminal identifies whether or not the operational information corresponding to the operational input relates to its own designated performance part.

The master terminal 2 is capable of giving an instruction to start a performance, via its operating section 5, and this performance start instruction is transmitted via the server 3 to the member terminals 4, and it enables the input control sections 6 of the member terminals 4 to accept input for the performance part designated to that terminal from the operating section 5. In specific terms, it is identified whether or not the operational information corresponding to an operational input is an instruction to start a performance, and if it is a performance start instruction, then this is transmitted from the master 2 to the members 4 via the server 3. At the member terminals 4, on the other hand, if the operational information corresponding to the operational input is an instruction to start a performance, then it is simply disregarded.

The operational information described above is, for example, key operational information in the form of a code indicating a key position generated inside a computer when a key arranged on an input keyboard of a computer is depressed. The code alters with simultaneous operation of a shift key, control key, or the like. Alternatively, the operational information is co-ordinates data indicated by a mouse pointer of a computer, or code information which corresponds to the co-ordinates data. This code information is used similarly to the aforementioned code indicating a key position, such that the same operational information can be output by using either key operation or mouse pointer operation.

The phrase performance information stored in the phrase performance information storing section 9 is common to all the terminals and stores the same phrase performance information. Each time that operational information is input, the corresponding phrase performance information indicated by the operational information is read out. A first example of phrase performance information stored in the phrase performance information storing section 9 is data in a file format that can be converted to sound waveform data by the sound generating section 10, which contains information on individual musical notes and tone quality and also duration information indicating the time duration of the musical event. To give a specific example, the data is in a standard MIDI file (SMF) format. Since this phrase performance information may be phrase data, a musical composition having a certain degree of coherence is achieved. Specifically, the data is musical composition data for one or several bars. Phrases may be created in the form of backing phrases or melody phrases. The phrases may be created by the user himself or herself, in which case they are installed to all members prior to the performance.

A second example of the phrase performance information stored in the phrase performance information storing section 9 is a wave-format file. In this case, the sound generating section 10 becomes obsolete, and only a D/A converting function for converting the digital waveform data to an analogue waveform is required, although the memory volume in the storing section 9 increases significantly.

Figure 2:
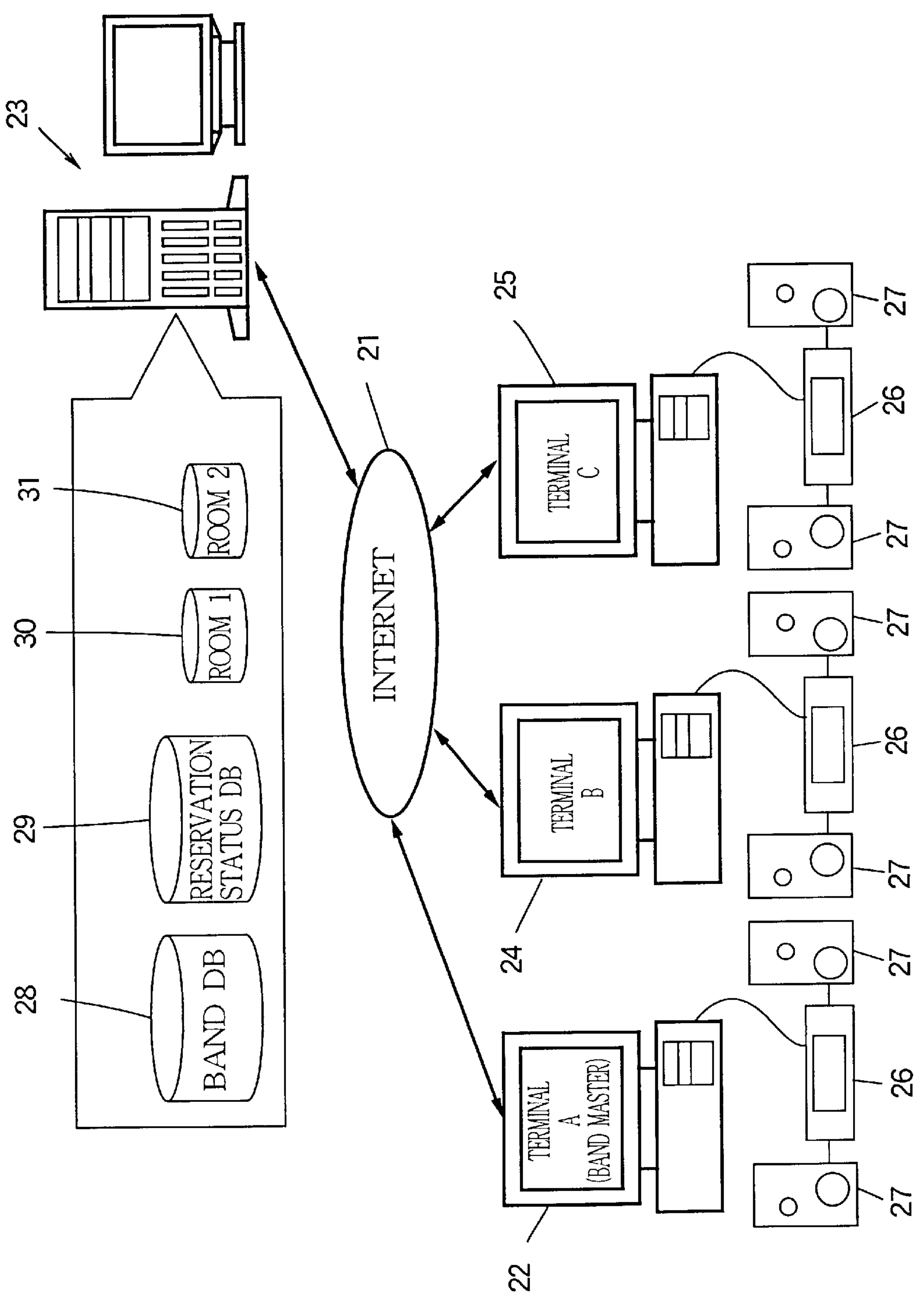
FIG. 2 is an illustrative diagram of an embodiment of a network performance system and network performance apparatus according to the present invention.

FIG. 2 is an illustrative diagram of an embodiment of a network performance system and a network performance apparatus according to the present invention. In the drawing, 21 denotes the Internet, 22 denotes a terminal A, 23 denotes a server, 24 denotes a terminal B, 25 denotes a terminal C, 26 denotes a musical sound generating device, 27 denotes a speaker, 28 denotes a band database, 29 denotes a reservation status database, 30 denotes a room 1 buffer, and 31 denotes a room 2 buffer. In this embodiment, the Internet 21 is used as the network 1 illustrated in FIG. 1, and a network performance is conducted using a plurality of computers as terminal A, terminal B and terminal C, and a single computer as the server 23.

In this example, terminal A is set as the master terminal and the user of this terminal is the band master. Terminal B is set as a member terminal 4 and its user is a band member. Terminal C is a further terminal, which cannot take part in the performance, but the user of terminal C is able to listen to the performance. In this example, the sound sources are external, each terminal A, B, C being connected respectively to musical sound generating devices 26. Each of the musical sound generating devices 26 reproduces the musical waveforms of each musical part and emits these waveforms via the speaker 27. Incidentally, it is also possible for each terminal to contain an in-built sound source. Moreover, a network configuration may be adopted wherein the server 23 and each of the terminals A–C 22, 24, 25 are connected via a relay server. Any number of terminals or band member terminals may be connected to a single server 23, and this information may also be controlled by the server 23.

The server 23 starts up a home page relating to the network band performance (net session) on the Internet. Terminal A 22 and terminal B 24 are previously installed with various programs and data forming software for conducting a network band performance. By assigning user IDs to terminal A 22 and terminal B 24, the right of access to the network band performance home page is granted. After terminal A 22 and terminal B 24 have accessed the home page started up by the server 23, various processes, such as band registration, band participation, performance room reservation, joint performance, and the like, can be implemented by running the various programs installed in the terminals. The server 23 and each of the terminals are controlled on the basis of time (timing) information set in each computer, and the reservation time and use time for performance rooms is controlled according to this time information. The time information for each terminal may also be controlled by the server 23.

The server 23 saves the various items of information to be stored in a database. Various information for each band currently registered, for example, the band name, band master terminal information, band member application status information, and the like, is stored in the band database 28. Information relating to the current reservation status of the imaginary performance rooms (room 1, room 2), for example, reservation time information, reserving band information, and the like, is stored in a reservation status database. The room 1 buffer 30 and room 2 buffer 31 each contain a performance room buffer storing information relating to the band using room 1 and room 2, and a phrase performance information buffer storing phrase performance information used by the band occupying that room in its performance. In addition to this, the server 23 stores various programs and data relating to starting up the home page, and the like, although this is omitted from the drawings.

On the home page started up by the server 23, it is possible to obtain phrase performance information used for a performance whilst playing various games. Moreover, it is also possible to prepare phrase performance information collections, or the like, and to obtain phrase performance information from these phrase performance information collections. The phrase performance information collection used by a band may be stored in the band database 28.

FIG. 3 is an illustrative diagram of information stored in one embodiment of a network performance apparatus according to the present invention. 41 denotes a key assignment table. This shows correspondence relationships between phrase numbers and the key positions to which the phrase performance information for each phrase number is assigned. The phrase performance information stored varies for each performance part. The key positions A, S, D, . . . indicate the names of keys arranged on a computer keyboard, and a phrase number (Phrase No.) and a part number (Part No.) attached to a performance part is assigned to each of these keys.

In the foregoing description, the performance parts and the phrase performance information for each phrase of each performance part are assigned to keys of a text keyboard, but it is also possible to generate operational information similar to keyboard input by assigning the different keys to a plurality of regions on a monitor screen and selecting these regions using a mouse pointer.

Numeral 42 denotes a phrase performance information storing section, which stores phrase performance information for each phrase number. By searching for a phrase number, the corresponding phrase performance information is read out. Therefore, when the user operates a certain key, operational information specifying that key position is generated, and by converting this operational information to a phrase number, the corresponding phrase performance information is read out. The data in the aforementioned key assignment table 41 and phrase performance information storing section 42 is installed as phrase performance information when the network band performance software is installed. The user may also download other phrase performance information from the home page. Numeral 43 denotes a user network address storing section, which stores the "network address of user" for each performance part number. To give an example, nicknames indicated by the users are set as the users' network addresses, and the server 23 converts these nicknames to the Internet IP addresses for each terminal having an assigned performance part, in order to deliver operational information.

Numeral 44 denotes a tempo information storing section, which stores tempo values for use in ensemble performance, for each of the performance part numbers. During initial setting processing, and the like, prior to a performance, the aforementioned addresses and tempo value are transmitted as terminal setting information via the server 23 to the terminal A 22 and terminal B 24 of all band members, including the band master. Tempo information may also be common to each part. If terminal C 25 is listening to the band performance, then this information is also transmitted to terminal C.

Figure 4:
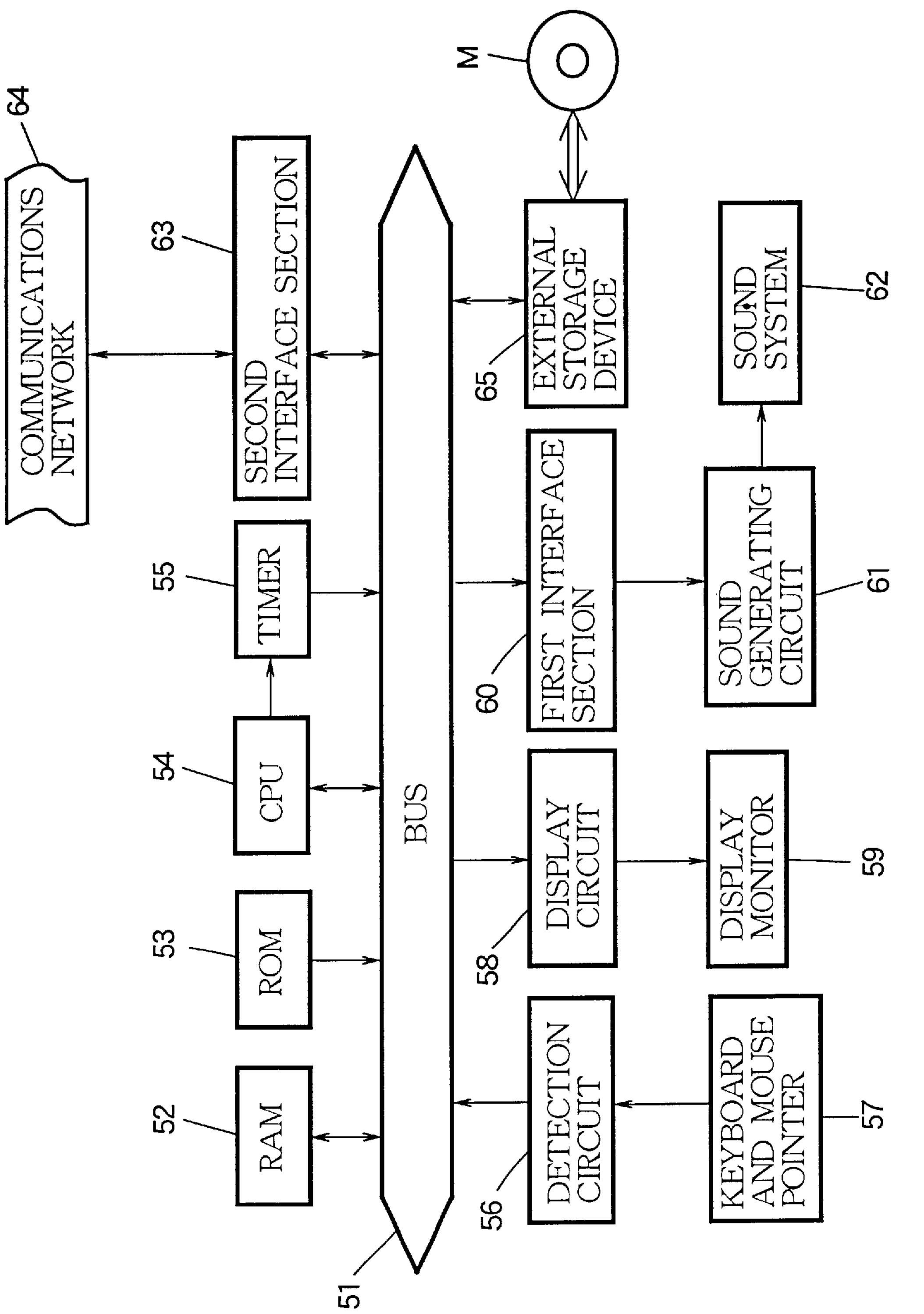
FIG. 4 is a hardware compositional diagram of an embodiment of a network performance apparatus according to the present invention.

FIG. 4 is a hardware configuration diagram of one embodiment of a network performance apparatus according to the present invention. In the diagram, 51 denotes a bus, 52 denotes a RAM, 53 denotes a ROM, 54 denotes a CPU, 55 denotes a timer, 56 denotes a detecting circuit, 57 denotes a keyboard and mouse pointer, 58 denotes a display circuit, 59 denotes a display monitor, 60 denotes a first interface section, 61 denotes a sound generating circuit, 62 denotes a sound system, 63 denotes a second interface section, 64 denotes a communications network, and 65 denotes an external storage device such as a hard disk drive, CD-ROM drive, flexible magnetic disk drive, magneto-optical (MO) drive, semiconductor memory card, or the like for receiving a machine readable medium M.

A plurality of blocks, such as a CPU 54, are connected to the bus 51. The standard functions of a personal computer are achieved by means of programs written to the ROM 53 and operating system (OS) programs recorded on the hard disk of the external storage apparatus 65. The CPU 54 executes the programs in the RAM 52. The timer 55 is controlled by the CPU 54 and determines interrupt timing. Operation of the keyboard and mouse pointer 57 is detected by the detecting circuit 56, and is transmitted to the CPU 54 via the bus 51. The CPU 54 creates an image on the display monitor 59 by means of display circuit 58.

The CPU 54 controls the sound generating circuit 61 via the first interface section 60. This sound generating circuit outputs musical sound waveforms to the sound system 62. The sound system 62 is provided with an audio amplifier and speaker(s). The CPU 54 conducts data communication with a server and other terminals located on the communications network 64, by means of the second interface section 63. Phrase performance information creating programs and phrase performance information, etc. for the purpose of giving a network performance, is stored on a machine readable medium M, such as a CD-ROM, semiconductor memory card, or the like, in the external storage apparatus 65, and it is supplied to the user of each terminal. Once installed on the hard disk of the external storage apparatus 65, programs are executed by being written directly to the RAM 52.

In cases where no hard disk drive is provided as an external storage apparatus 65, a control program is recorded in the ROM 53, and by reading this program into the RAM 52, it is possible to make the CPU 54 perform a similar operation to the case where a control program is stored in the external storage apparatus 65. If no hard disk apparatus is provided, or if no control program or data is stored in the hard disk apparatus, then phrase performance information creating programs, phrase performance information, and the like, can be downloaded from the server by means of the communications network 64. Upgraded versions can also be downloaded via the communications network 64. The second interface section 63 is connected to a communications network such as a LAN (local area network), the Internet, a designated circuit, or the like, and it connects to the server by means of this network.

The terminal forms a client of the server, and it transmits commands requesting download of programs or data to the server, via the second interface section 63 and the communications network 64. The server receives this command and delivers the requested programs or data to the terminal via the communications network 64. The terminal receives the programs or data via the second interface 63 and stores them in the hard disk of the external storage apparatus 65, thereby completing the downloading operation.

Figure 5:
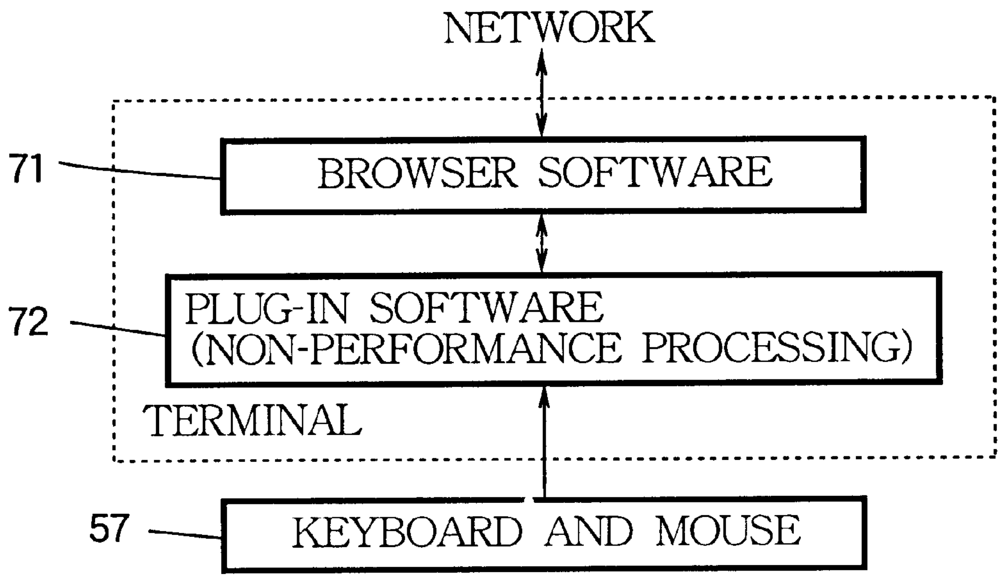
FIG. 5 is an illustrative diagram of transmission and reception processing in a non-performance state in an embodiment of a network performance apparatus according to the present invention.
Figure 6:
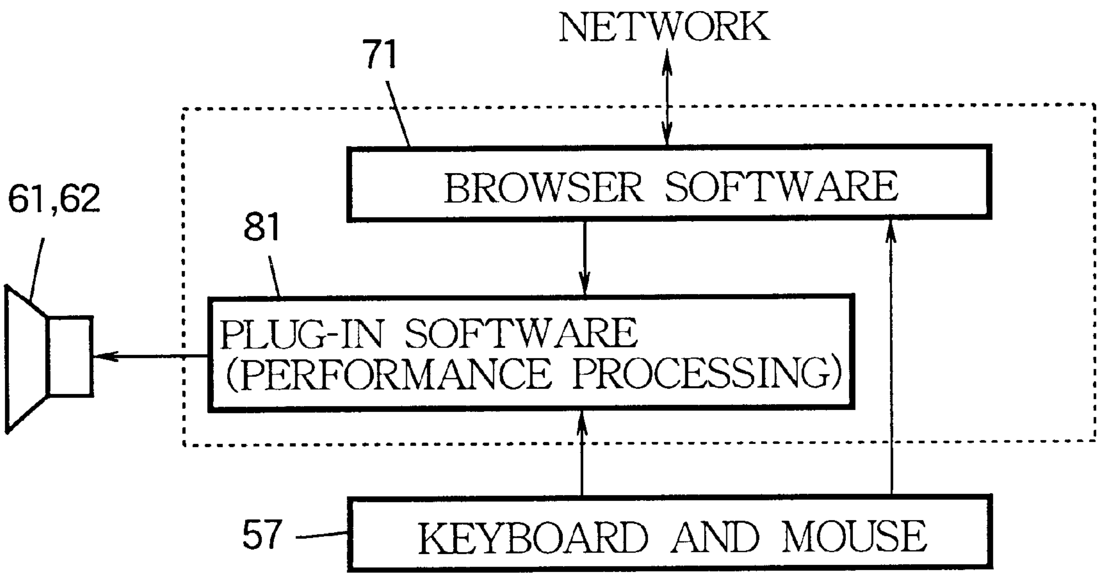
FIG. 6 is an illustrative diagram of transmission and reception processing in a performance state in an embodiment of a network performance apparatus according to the present invention.
Figure 7:
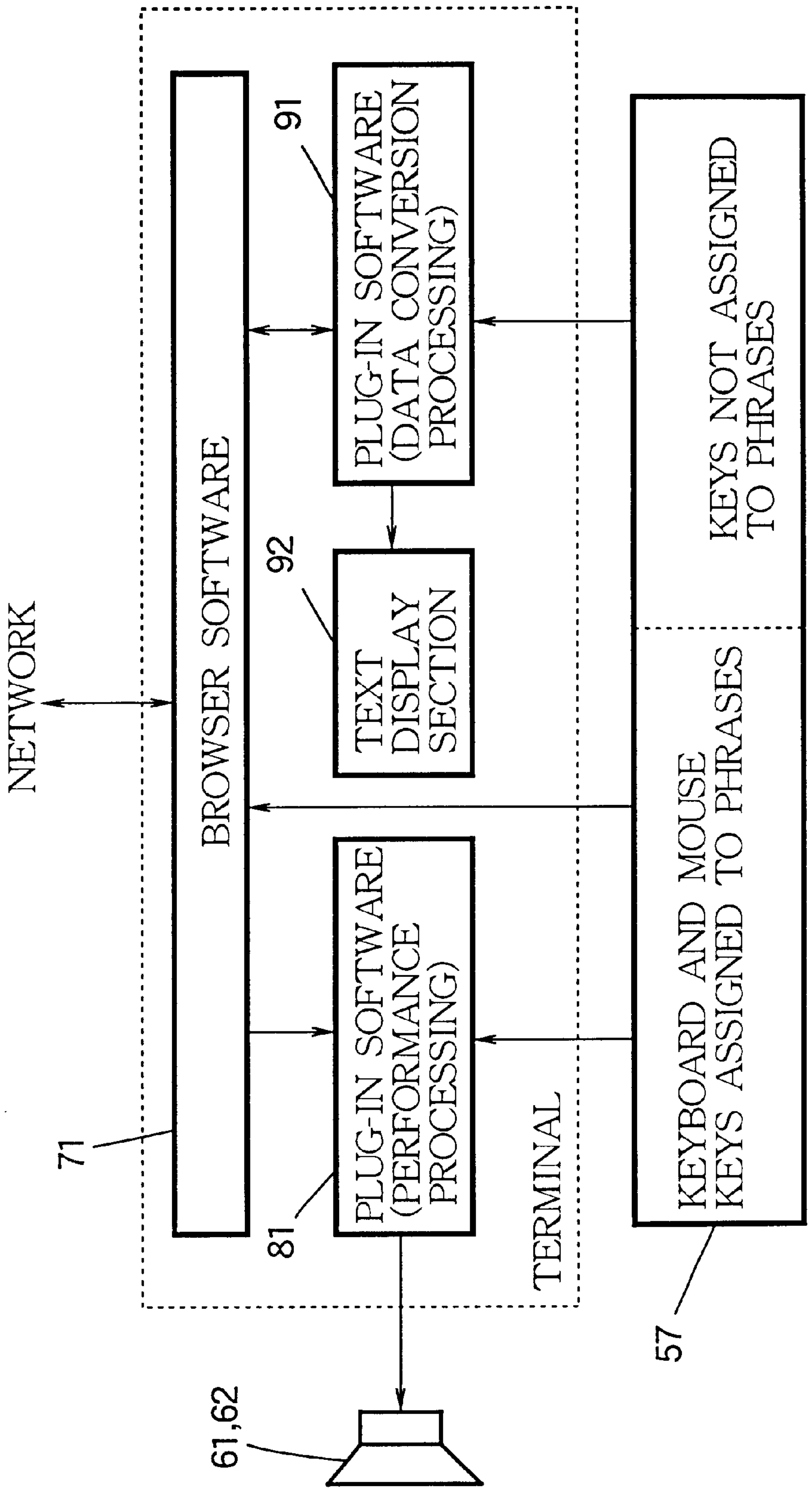
FIG. 7 is an illustrative diagram of transmission and reception processing for conducting chat in a performance state in an embodiment of a network performance apparatus according to the present invention.

FIG. 5 to FIG. 7 are illustrative diagrams of transmission and reception processes in an embodiment of a network performance apparatus according to the present invention. FIG. 5 shows a non-performance state; FIG. 6 shows a performance state; and FIG. 7 shows a case where a chat is being carried out whilst in a performance state. In the diagrams, parts which are the same as in FIG. 4 are similarly labelled. Numeral 71 denotes browser software, 72 denotes plug-in software (non-performance processing), 81 denotes plug-in software (performance processing), 91 denotes plug-in software (data conversion processing), and 92 denotes a text display section. These plug-in software are network performance software, and are plug-in software relating to browser software, such as a WWW browser on the Internet, for example, Netscape Navigator (trademark, Network Communications Corporation), which are installed when the software is installed.

In the state illustrated in FIG. 5, operations such as performance band registration, performance member registration, performance room reservation, and the like, are carried out. The plug-in software (non-performance processing) 72 implements various processing, as and when required, on the basis of the operational information corresponding to the operational input from the keyboard and mouse pointer 57, and it transfers the results of this processing to the browser software 71. The browser software 71 converts this information to a prescribed communications protocol, for example, HTTP (hyper text transfer protocol), and transmits the operational information to the server on the network.

The server implements various processing, as and when required, on the basis of information received from the terminals, and it transmits this information to the browser software 71 in the terminal by means of the prescribed communications protocol. The browser software 71 receives this information, conducts its own processing, and then transfers data to the plug-in software (non-performance processing) 72. The browser software 71 processes the data to be transferred to the plug-in software (non-performance processing) 72 on the basis of the data type, for example, which is determined by observing the file extension.

In the performance state shown in FIG. 6, the plug-in software (performance processing) 81 refers to the key assignment table 41 illustrated in FIG. 3 which has been read into the RAM 52 shown in FIG. 4, and from the phrase performance information storing section 42 recorded in the same RAM 52, it reads out phrase performance information in accordance with the operational information corresponding to the operational input from the keyboard and mouse pointer 57 at the terminal in question, and outputs this information to the sound generating circuit 61 and sound system 62. Moreover, referring to the operational information input from the keyboard and mouse pointer 57 of the terminal in question and the user network address storing section 43 in FIG. 3 which has been read into the RAM 52 shown in FIG. 4, the plug-in software (performance processing) 81 transfers the addresses of all the terminals having performance parts except for the terminal in question to the browser software 71, which transmits these to the server on the network. The server delivers the operational information received from each terminal to all the other terminals specified by the addresses received similarly from each terminal.

At the same time, the plug-in software (performance processing) 81 receives the operational information input from the keyboard and mouse pointer 57 of the other terminals, via the server, and it reads out phrase performance information for each performance part corresponding to this operational information and outputs this information to the sound generating circuit 61 and the sound system 62. Therefore, the plug-in software (performance processing) 81 detects the operational information and, triggered by this operational information, it performs the function of a sequencer which automatically performs a phrase of musical sounds. If a tempo A setting alteration procedure has been implemented by operation of a key to which a tempo switching function has been assigned, then the plug-in software (performance processing) 81 alters the tempo value of the performance part of the home terminal in the tempo information storing section 44 illustrated in FIG. 3, and it also transmits the modified tempo value instead of operational information indicating phrase performance information. Receiving this information from the server, the other terminals read in the tempo value, and alter the tempo value of the received part in their tempo information storing section 44. This tempo switching function may be assigned to any of the keys on the keyboard, or, similarly to the allocation of phrase performance information, it may be assigned to a region of a display screen.

In FIG. 7, the performance processing described with reference to FIG. 6 and transmission and reception processing of text information (chat) on the text display section 92 are executed substantially in real time (slight delay may occur due to circuit congestion, or the like), by means of input operations made via the keyboard and mouse pointer 57 during a performance. The time periods for conducting chat and performance may be kept separate, but here, they are carried out simultaneously. In other words, in input operation processing, if a key to which phrase performance information is assigned is operated, the network performance software operates as plug-in software (performance processing) 81. If a key to which phrase performance information (phrase data) is not assigned is operated, the network performance software operates as plug-in software (data conversion processing) 91, and the operational information is converted to text information for chat and displayed by the text display section 92 on the screen of the terminal, whilst the operational information is also transferred to the browser software 71 and transmitted to the other terminals via the server, similarly to the case in FIG. 6. At the other terminals, the network performance software processes this operational information as plug-in software (data conversion processing) 91, and displays text on the text display section 92.

Not all the keys can be used for text display for chat. Therefore, provided that common short text items corresponding to the keys which can be used for chat are previously registered in all the terminals, the receiving side is able to display the short text items on its text display section 92 on the basis of the operational information. If a plurality of human voice sounds recorded as wave files are assigned to keys instead of short text items, then these human voice sounds can be output from the sound system in the same way as the musical sounds. Moreover, it is also possible to adopt a system whereby, if a key is pressed whilst holding down the shift key, that key is identified as a chat key.

As described above, the inventive network performance system comprises a plurality of performance apparatuses 2 and 4 each storing phrase performance information of a plurality of performance parts and each being allocated with one of the performance parts to conduct an ensemble performance composed of the plurality of the performance parts, and a server apparatus 3 connected to each of the performance apparatuses 2 and 4 via a network 1. Each of the performance apparatuses 2 and 4 is manually operable to input operational information relating to the performance part allocated thereto, and transmits the inputted operational information to the server apparatus 3 via the network 1. The server apparatus 3 delivers the operational information transmitted by each of the performance apparatuses 2 and 4 to other of the performance apparatuses 2 and 4 via the network. Each of the performance apparatuses 2 and 4 receives the operational information relating to other performance parts allocated to other of the performance apparatuses 2 and 4 from the server apparatus 3 via the network 1, and reproduces the phrase performance information of the performance part allocated thereto in response to the inputted operational information and concurrently reproduces the phrase information of other performance parts allocated to other of the performance apparatuses 2 and 4 in response to the received operational information to thereby conduct the ensemble performance composed of the plurality of the performance parts.

As shown in FIG. 1, the performance apparatus 4 is allocated with one of a plurality of performance parts and stores phrase performance information of the plurality of the performance parts to conduct an ensemble performance composed of the plurality of the performance parts in communication with other performance apparatus 2 through a network 1. The performance apparatus 4 comprises an input device 5 that is manually operable to input operational information relating to the performance part allocated to the performance apparatus, a receiver device 7 that receives operational information being inputted by other performance apparatus 2 and relating to other performance part allocated to other performance apparatus 2 via the network 1, and a sound device 10 that reproduces the phrase performance information of the performance part allocated to the performance apparatus 4 in response to the inputted operational information and that concurrently reproduces the phrase information of other performance part allocated to other performance apparatus 2 in response to the received operational information to thereby conduct the ensemble performance composed of the plurality of the performance parts.

Specifically, as shown in FIG. 4, the performance apparatus comprises an input device 57 that is manually operable to input operational information, a control device 54 that operates when the inputted operational information is adequately relating to the allocated performance part for transmitting the inputted operational information to other performance apparatus via the network so as to conduct the ensemble performance in other performance apparatus, and that operates when the inputted operational information is inadvertently relating to other performance part allocated to other performance apparatus for prohibiting transmission of the inputted operational information, and a sound device 61 that reproduces the phrase performance information of the allocated performance part in response to the inputted operational information when the inputted operational information is adequately relating to the allocated performance part, the sound device prohibiting reproduction of the phrase performance information when the inputted operational information is inadvertently relating to other performance part allocated to other performance apparatus.

Referring back to FIG. 1, the performance apparatuses 2 and 4 are designated as either of a master and a member and are allocated with respective ones of a plurality of performance parts to conduct an ensemble performance. The performance apparatus 2 or 4 comprises an input device 57 (FIG. 7) that has a first operator manually operable to input operational information effective to execute the allocated performance part, and a second operator assigned with a special function and being manually operable to input information effective to initiate the ensemble performance, and a control device 6 (FIG. 1) that operates when the performance apparatus 2 is designated as the master for enabling the second operator so as to input the command information and to transmit the inputted command information to other performance apparatus 4 via the network 1 to initiate other performance apparatus 4, and that operates when the performance apparatus 4 is designated as the member for disabling the second operator so as to prohibit inputting of the command information.

Further, referring to FIG. 4, a machine readable medium M is for use in a computer machine containing CPU 54 being allocated with one of a plurality of performance parts and storing phrase performance information of the plurality of the performance parts to conduct an ensemble performance composed of the plurality of the performance parts in communication with other computer machine through a network. The machine readable medium M contains a program executable by CPU 54 of the computer machine to carry out an ensemble performance process comprising the steps of inputting operational information relating to the performance part allocated to the computer machine, receiving operational information being inputted by other computer machine and relating to other performance part allocated to other computer machine via the network, reproducing the phrase performance information of the performance part allocated to the computer machine in response to the inputted operational information, and concurrently reproducing the phrase information of other performance part allocated to other computer machine in response to the received operational information to thereby conduct the ensemble performance composed of the plurality of the performance parts.

Referring back again to FIG. 1, the server apparatus 3 is connected via a network 1 to a plurality of performance apparatuses 2 and 4 each storing phrase performance information of a plurality of performance parts and each being allocated with one of the performance parts to conduct an ensemble performance composed of the plurality of the performances parts. The server apparatus 3 comprises a receiver device in the form of the interface section 12 that receives operational information from each of the performance apparatuses 2 and 4 via the network 1, the operational information being inputted by each of the performance apparatuses 2 and 4 and relating to the performance part allocated to each of the performance apparatuses, and a transmitter device also in the form of the interface section 12 that transmits the operational information inputted by each of the performance apparatuses 2 and 4 to other of the performance, apparatuses 2 and 4 via the network 1, thereby enabling each of the performance apparatuses 2 and 4 to receive the operational information relating to other performance part allocated to other of the performance apparatuses and to reproduce the phrase information of other performance part allocated to other of the performance apparatuses 2 and 4 in response to the received operational information, while allowing each of the performance apparatuses to reproduce the phrase performance information of the performance part allocated to each performance apparatus in response to the inputted operational information to thereby conduct the ensemble performance composed of the plurality of the performance parts.

FIG. 8 to FIG. 16 are flowcharts illustrating the operation of one embodiment of a network performance system according to the present invention. The step numbers, starting from step S101, are applied in sequence commonly to the processing of terminal A, the server, and terminal B, but terminal A, the server and terminal B are each operated according to different programs.

FIG. 17 to FIG. 23 are illustrative diagrams of display screens at different stages during the operation of the embodiment of a network performance system according to the present invention. The operation is described in sequence from FIG. 8, with reference to the appropriate display screen.

Figure 8:
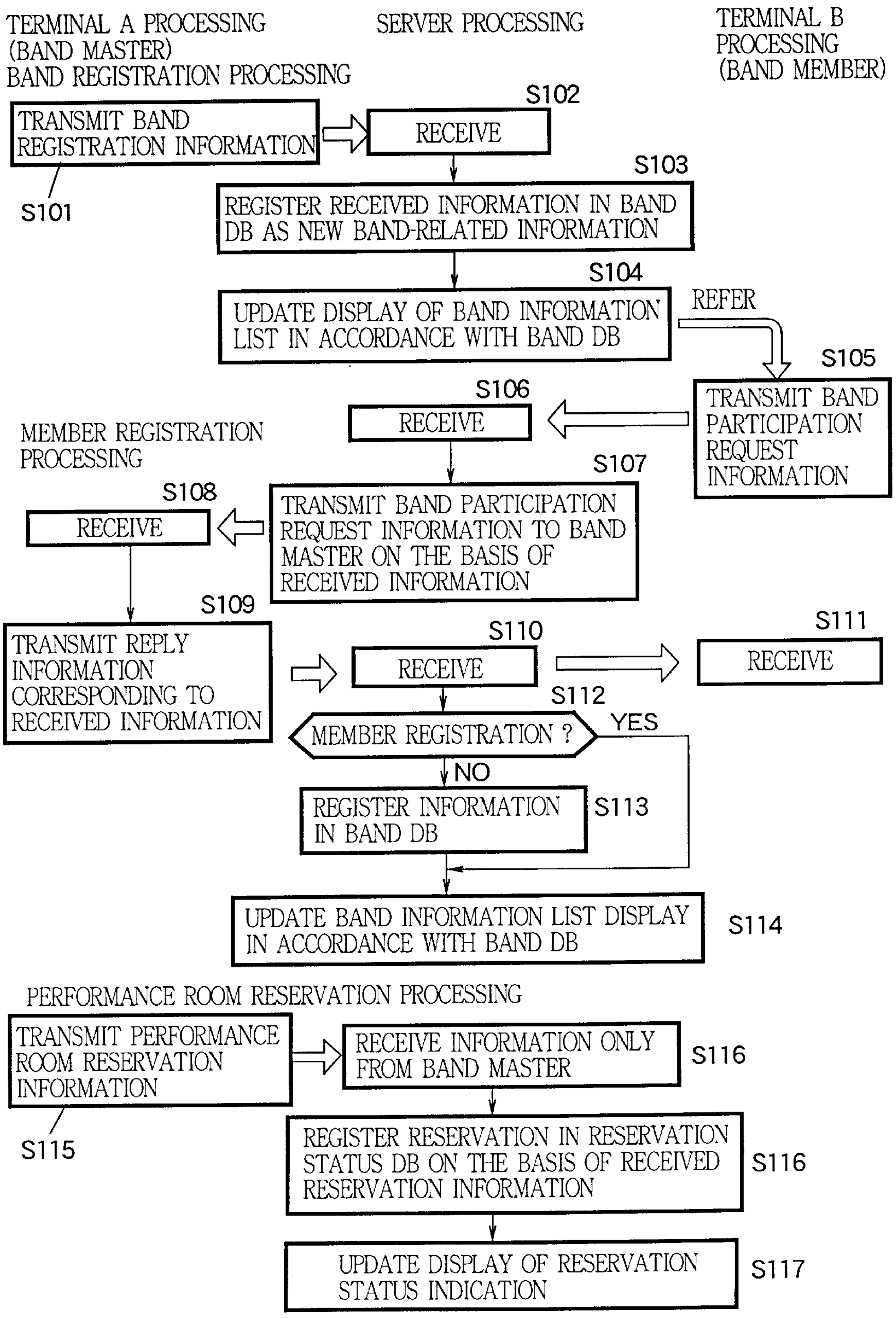
FIG. 8 is a flowchart of band registration processing, member registration processing and performance room reservation processing in an embodiment of a network performance system according to the present invention.

FIG. 8 is a flowchart of band registration processing, member registration processing and performance room reservation processing. Band registration processing involves registering the band using the home page started up by the server 23 in FIG. 2. The user making the registration becomes the band master (band director) of the registered band. Anyone is able to register one band, provided that he or she has a terminal having the right of access to the network band performance home page. Member registration processing involves each terminal sending application information to a band which the user of that terminal wishes to join by referring to a band information list on the home page, whereupon the band master determines the participating members of the band on the basis of this application information and registers these members in the band database 28 in the server 22. The number of participating members can be set to any number. Any one user can only be the band master of one band at maximum, but he or she may take part is a plurality of bands as an ordinary member. Once the members have been decided, the member application process relating to that band is completed.

Performance room reservation processing is the process of reserving a performance room for the band members of each band to conduct a band performance (session). Here, a performance room is an imaginary room, which is represented by an icon on the home page. It can be said that the performance room is actually constituted by the program in the server 23 which provides the network connection and control between the band members during a band performance. A band performance is carried out by using a performance room. A predetermined number of performance rooms (for example, two rooms) are provided on the home page. Each band is able to use a performance room by entering a reservation for a use time for a performance room. The reservation status of the performance rooms (omitted from drawings) is displayed on the home page to aid the making of reservations. Only the band master of each band is able to make a reservation for a performance room.

Figure 17:
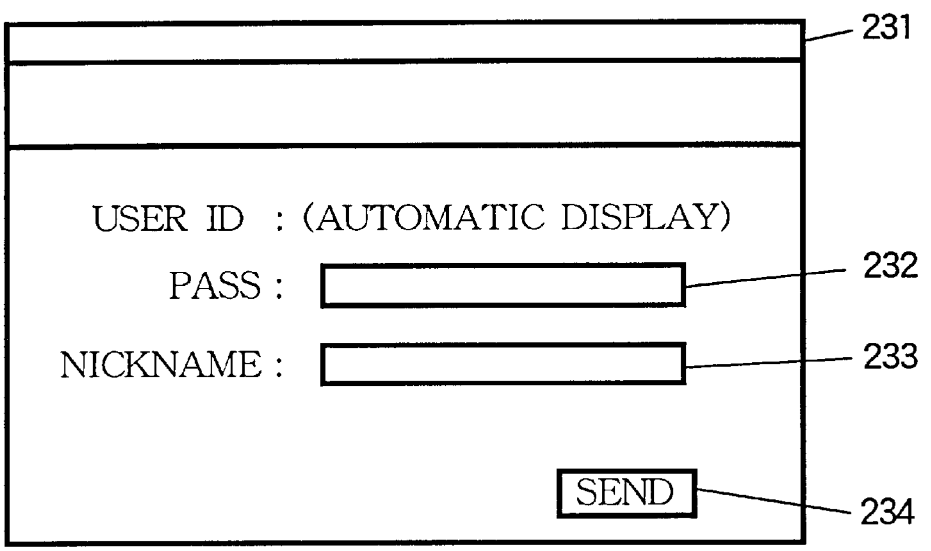
FIG. 17 is an illustrative diagram of an initial profile registration screen in an embodiment of a network performance apparatus according to the present invention.

FIG. 17 is an illustrative diagram of an initial profile registration screen. An initial profile registration screen 231 based on a web browser is depicted. It is assumed that the user ID has already been transmitted. When participating in a network band performance, initially, a user enters a password in the text box 232 on this initial profile registration screen 231 by means of a keyboard, and then inputs his or her nickname in the text box 233. By clicking the mouse pointer on the send button 234, the input text information is transmitted by the web browser software to the server 23. If this process is carried out correctly, the screen returns to the top page, and here, by clicking on the band information region, the display moves to the next screen, namely, the band master registration screen, as illustrated in FIG. 18.

Figure 18:
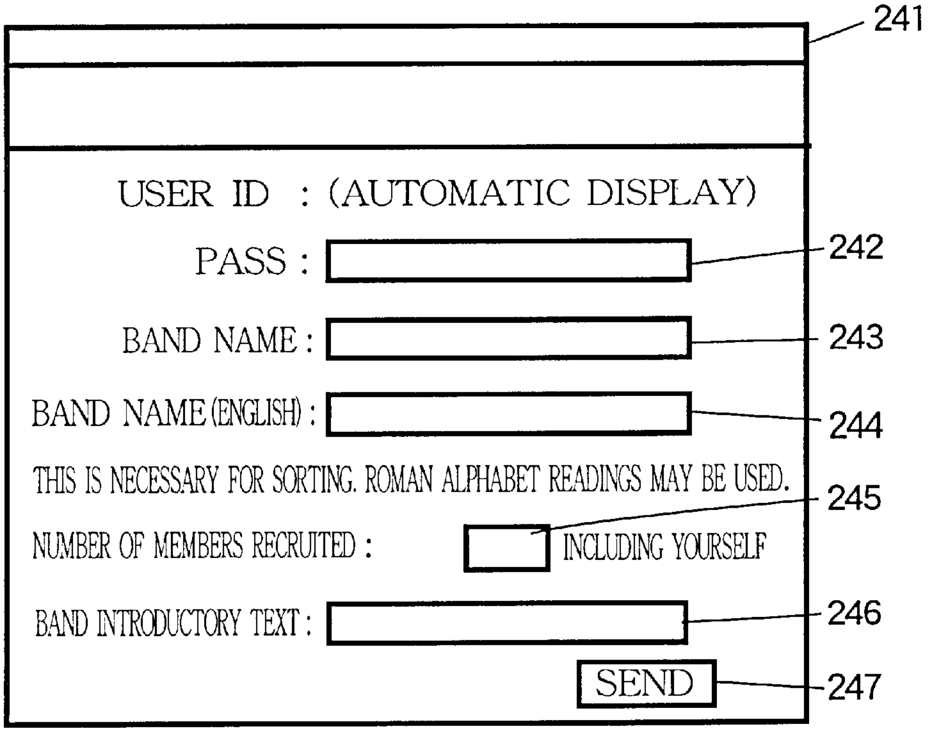
FIG. 18 is an illustrative diagram of a band master registration screen in an embodiment of a network performance apparatus according to the present invention.

FIG. 18 is an illustrative diagram of a band master registration screen. Step S101 in FIG. 8 is carried out on this screen, and the required registration information is input and transmitted to the server. Terminal A 22 shown in FIG. 2 transmits the band registration information. On the band master registration screen 241, using the keyboard, the user enters a password in the text box 242, the band name in the text box 243, and the band name in Roman alphabet in text box 244. The number of band members is entered in text box 245, and an introductory text for the band is entered in text box 246. When the input is finished and the send button 247 is clicked with the mouse pointer, the input text information is sent by the web browser software to the server 23. As registration information, other than the information shown in FIG. 18, the network address of the terminal in question (terminal A 22) and its designated performance part (instrument) may also be input.

At step S102, the server 23 receives registration information from terminal A 22. At step S103, the received information is registered in the band database in FIG. 2 as new band-related information. In doing this, a band member list (mailing list which can only be used by the band members) corresponding to the band registered by terminal A is also created. This band member list is used principally for introducing band members when a performance room is used, or for exchanging information within the band. At step S104, the display of the band information list is modified to correspond to the band database 28.

Figure 19:
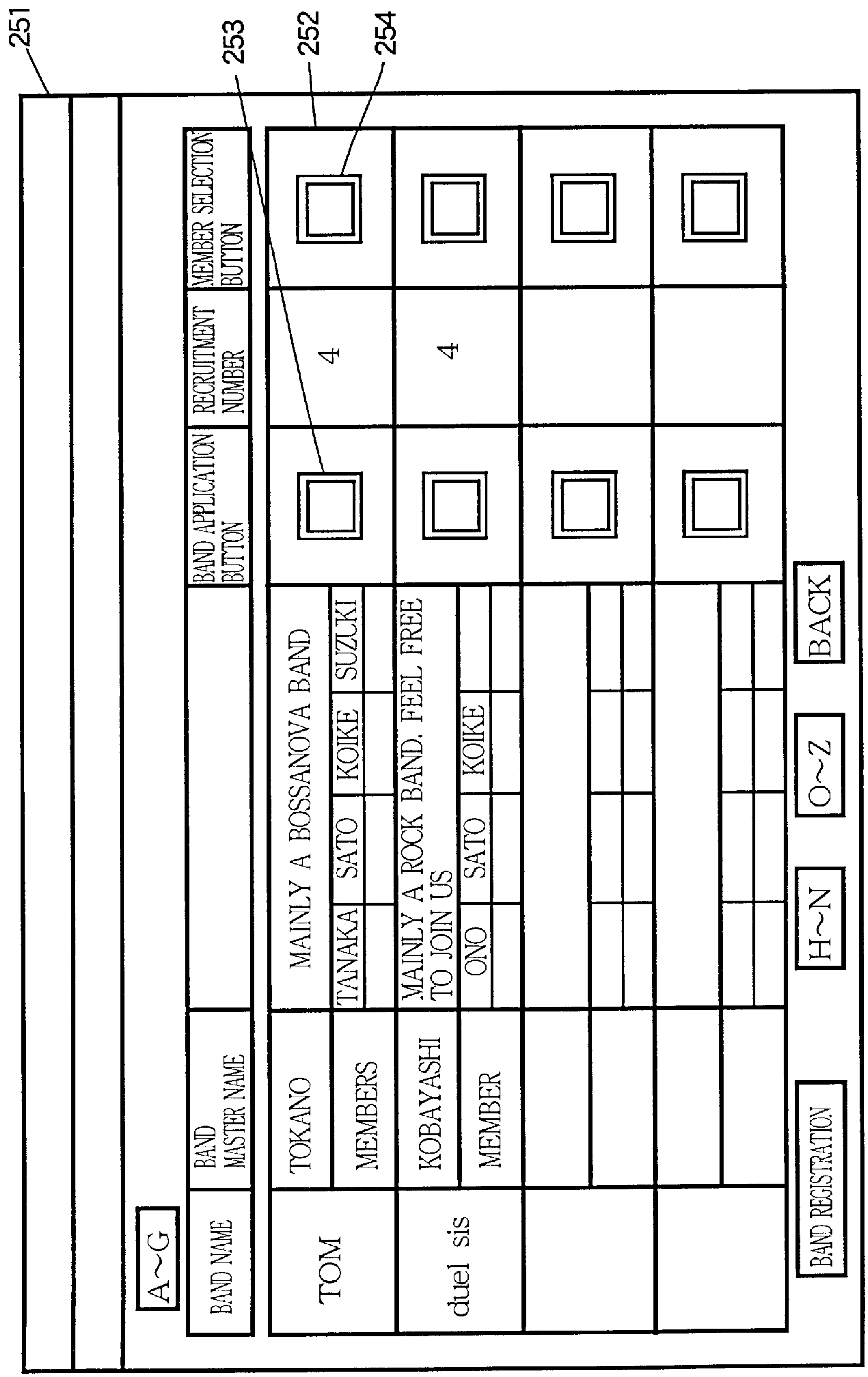
FIG. 19 is an illustrative diagram of a band information list screen in an embodiment of a network performance apparatus according to the present invention.

FIG. 19 is an illustrative diagram of a band information list screen. The band information list 251 can be viewed by switching from the top page. A display region 252 is provided for each band. In each display region 252, the band name, band master name (nickname) and band member names (nicknames) are displayed, starting from the left, and a member application button 253, the number of members to be recruited, and a member selection button 254 are displayed. When recruitment of members for a particular band has been completed, the band master disables the member application button 253 on the band information list 251.

Figure 20:
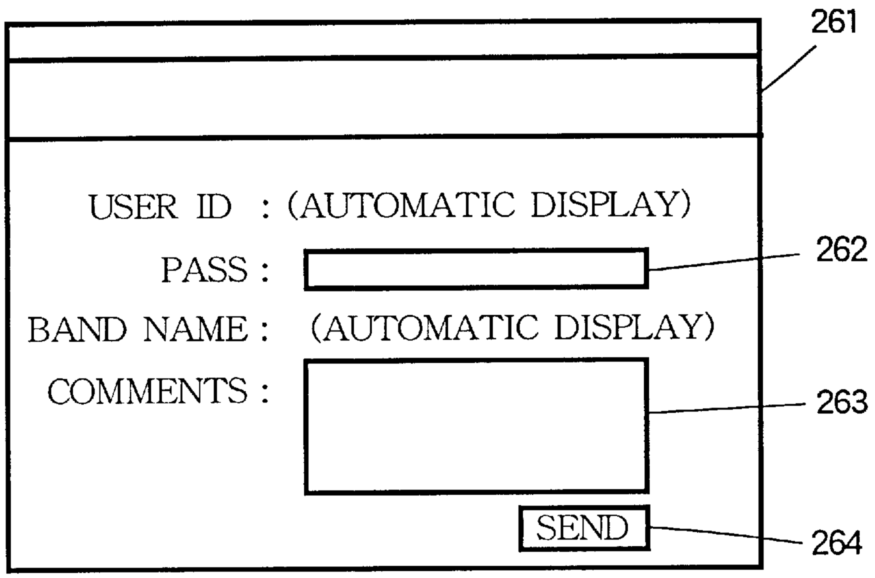
FIG. 20 is an illustrative diagram of a member application screen in an embodiment of a network performance apparatus according to the present invention.

At step S105 in FIG. 8, if the user at terminal B 24 clicks on the member application button 253 on the band information list 251, then the display transfers to the member application screen. FIG. 20 is an illustrative example of a member application screen. By means of the user entering a password in the text box 262 of the member application screen 261, entering comments in the text box 263, and clicking on the send button 264, band participation request information is transmitted to the server 23. Although omitted from the illustration of the member application screen 261, it is also possible to enter the performance part the user wishs to play. At step S106, the server 23 receives this band participation request information, and at step S107, it transmits the band participation request information to the band master on the basis of the received information. Here, the user ID in the received recruitment information is not transmitted, but the user name, comments and the performance part to be played, etc., which are omitted from FIG. 20, are transmitted.

Figure 21:
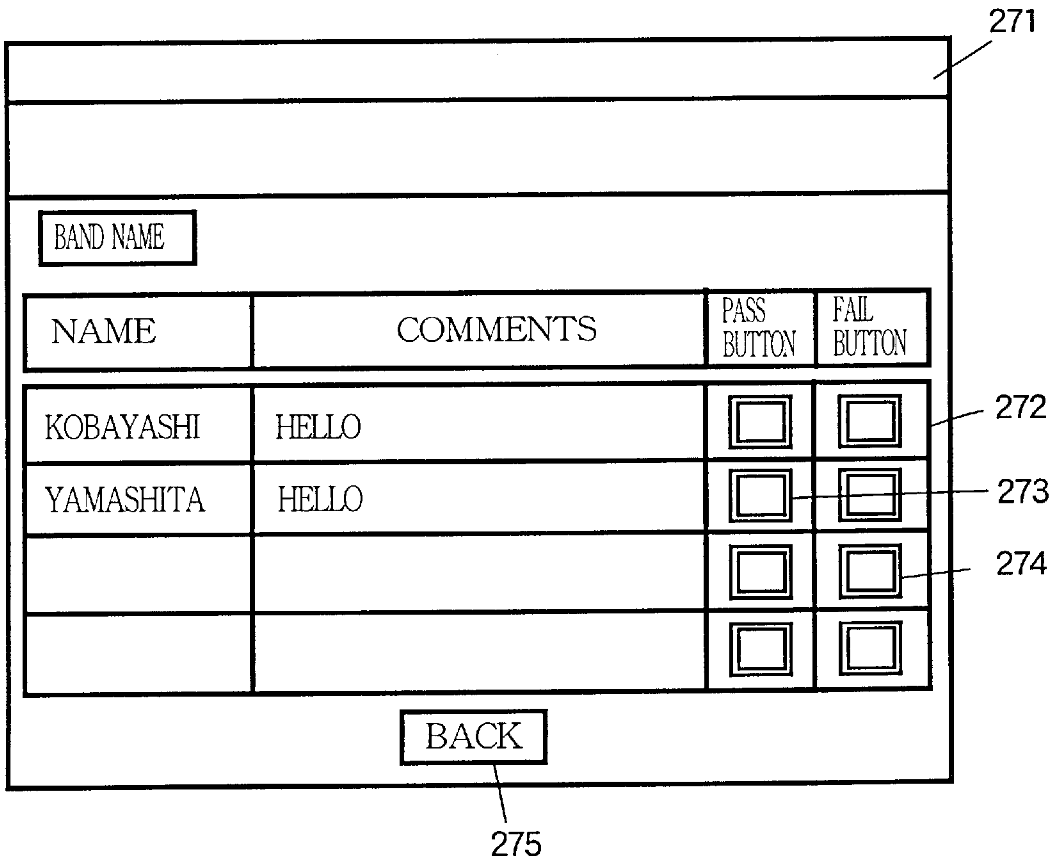
FIG. 21 is an illustrative diagram of a member selection screen in an embodiment of a network performance apparatus according to the present invention.

At step S108, terminal A22 receives a mail from the server 23 indicating that there has been a membership application. At step S109, response information corresponding to the received information, for example, acceptance or refusal of band membership, user name, and other comments, are transmitted. FIG. 21 is an illustrative diagram of a member selection screen. This screen is brought up by clicking on the member selection button 254 on the band information list 251 illustrated in FIG. 19. A display region 272 is provided on the member selection screen 271 for each user who has made an application. On each display region 272, starting from the left, the user name, comments, a pass button 273, and a fail button 274, are displayed. The band master decides whether to accept or refuse each person individually, and clicks on either the pass button 273 or the fail button 274, accordingly. The back button 275 is used to return to the band information list 251 in order to check information items.

If the master clicks on the pass button 273 or fail button 274, the server 23 receives this at step S110, and transmits amail containing a pass notification or failure notification to the respective user. At step S111, terminal B receives this mail. The server 23 determines whether or not a user who has currently passed is already registered as a member, and if that user had not been registered as a member, then it proceeds to the processing in step S113, whilst if the user is already registered, it proceeds to the processing in step S114. At step S113, the application information from terminal B (new band member) 24 is registered in the band-related information controlled by terminal A (band master), which is registered in the band database (numeral 28 in FIG. 2). At step S114, the user name, address, user ID, and the like, relating to terminal B are registered in the band member list for the aforementioned band, in accordance with the band database 28, and the display of the band information list 251 shown in FIG. 19 is modified accordingly.

In the performance room reservation process, at step S115, the reservation status of the performance rooms is verified on the display screen relating to studio reservations on the home page. The user clicks on prescribed display regions relating to the desired performance room reservation information, for example, the user's own ID, band name, reserved performance room number, reservation time period, and the like, and the user then clicks on the send button. The server 23 will only accept information from the band master at step S116. The server 23 therefore determines whether or not the received reservation information is from terminal A (band master) 22, by reading the user ID and band name and referring to the information in the band database 28. If the information is from the terminal A (band master) 22, then the subsequent performance room acceptance processing is implemented. At step S117, provided that a reservation corresponding to the received reservation information can be made, a reservation is registered in the reservation status database (numeral 29 in FIG. 2) on the basis of the received reservation information. If it is not possible to make the reservation, then a message to this effect is sent to terminal A (band master) 22 and the reservation is not registered in the reservation status database 29. At step S118, the reservation status display is modified.

Figure 9:
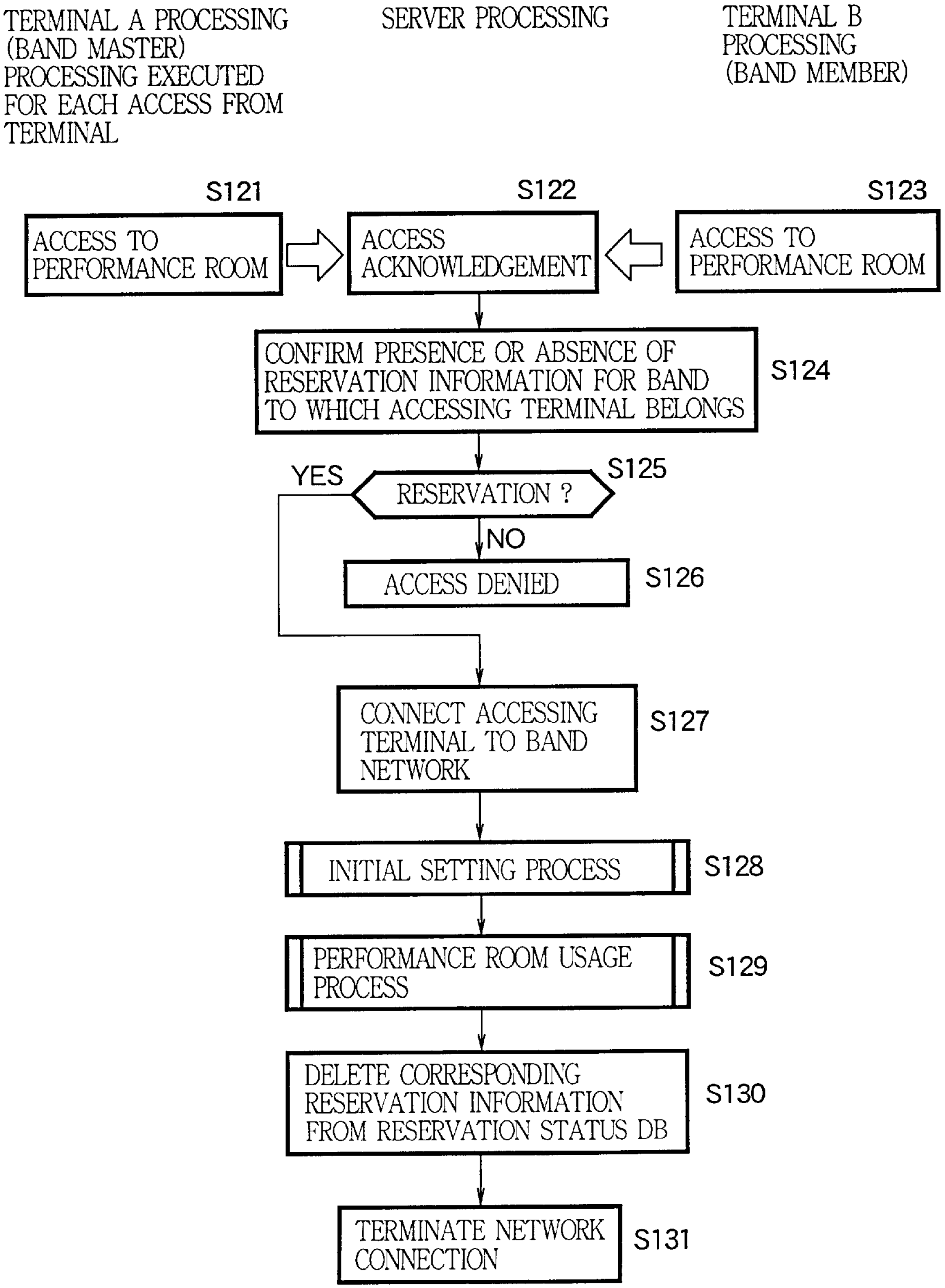
FIG. 9 is a flowchart of access to a performance room in an embodiment of a network performance system according to the present invention.

FIG. 9 is a flowchart of access to a performance room. Access to a performance room can be gained by clicking on the performance room (icon) on the home page at the start time of the reservation that has been made, thereby enabling the performance room to be used. The time is controlled on the basis of time information set previously in the server. Firstly, when using a performance room, it is necessary for terminal A (band master) 22 to gain access. Thereby, even in cases where a single terminal is registered to a plurality of bands, the comparison processing with the band using the performance room will be carried out accurately. If no access is made from terminal B (band member) 24 after a prescribed time (for example, 15 minutes,) from the start of the reservation time, the reservation information registered in the registration status database (numeral 29 in FIG. 2) is automatically erased. Furthermore, when a reservation has been erased, any band, including a band which has not made a reservation, can use the performance room, provided that it accesses the room at this opportunity. Provided that terminal A (band master) 22 has started to use the performance room, terminal B (band member) 24 is able to access the performance room at any time during the reserved period. It is also possible for any terminal to terminate its access to the performance room during use of the performance room. Access to a performance room is made by clicking on the performance or attendance display regions on the top page of the home page, whereby the network band performance plug-in software is started up. This processing is implemented separately for each access operation by terminal A (band master) 22 or terminal B (band member) 24. At step S121, if the performance room has been accessed by terminal A (band master) 22, then at step S122, the server 23 recognises this access, and at step S124, it confirms whether or not there is reservation information for a band belonging to the accessing terminal by referring to the reservation status database (numeral 29 in FIG. 2) and the band database (numeral 28 in FIG. 2). Furthermore, if access has been made from terminal B (band member) 24, then the server 23 simultaneously confirms whether or not terminal A (band master) 22 has already accessed the room. This confirmation is made using the data in the performance room buffers (buffer 30 for room 1 and buffer 31 for room 2 in FIG. 2).

At step S125, if it is judged that a reservation has been made, then processing moves on to step S127, but if it is judged that there is no reservation, then processing moves to step S126 and access is denied. In the case of access from terminal A (band master) 22, access is denied if the use time or band name differs from the reservation information in the reservation status database 29. In the case of terminal B (band member), access is denied if terminal A (band master) 22 of the band to which the user at terminal B belongs has not previously made access, or if the reserving band is not the band to which that user belongs.

At step S127, the accessing terminal is connected to a network linking the performing band. Information can then be transmitted and received between terminal A (band master) 22 and terminal B (band member) 24 which have currently gained access to the performance room. In specific terms, the band member list in the band database 28 starts to be used, and a state is assumed where information transmitted from one terminal out of terminal A (band master) 22 and terminal B (band member) 24 is sent to all the other terminals which have gained access.

At step S128, initial setting processing is carried out, as described hereinafter with reference to FIG. 10 to FIG. 12. At step S129, performance room use processing is carried out, as described hereinafter with reference to FIG. 13 to FIG. 16. When performance room use processing is completed, at step S130, the reservation information is erased from the reservation status database (numeral 29 in FIG. 2), and at step S131, the use of the band member list in band database 28 is ended, the display screen returns from the performance screen to the home page screen, and the network connection is terminated.

Figure 10:
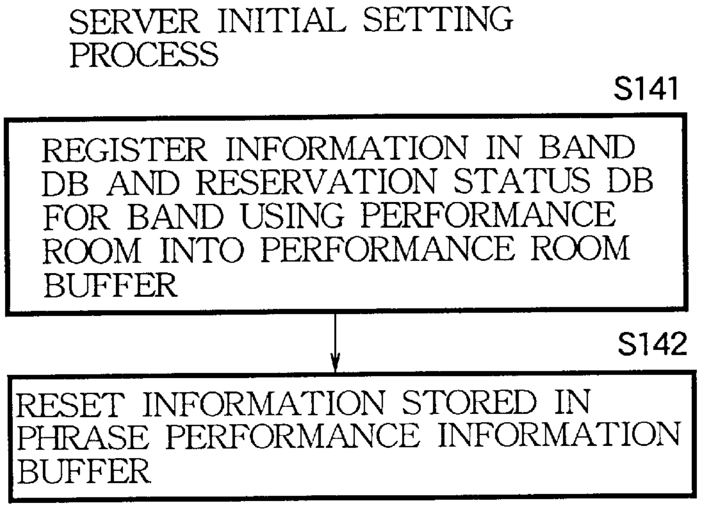
FIG. 10 is a flowchart of initial setting processing at a server in an embodiment of a network performance system according to the present invention.
Figure 11:
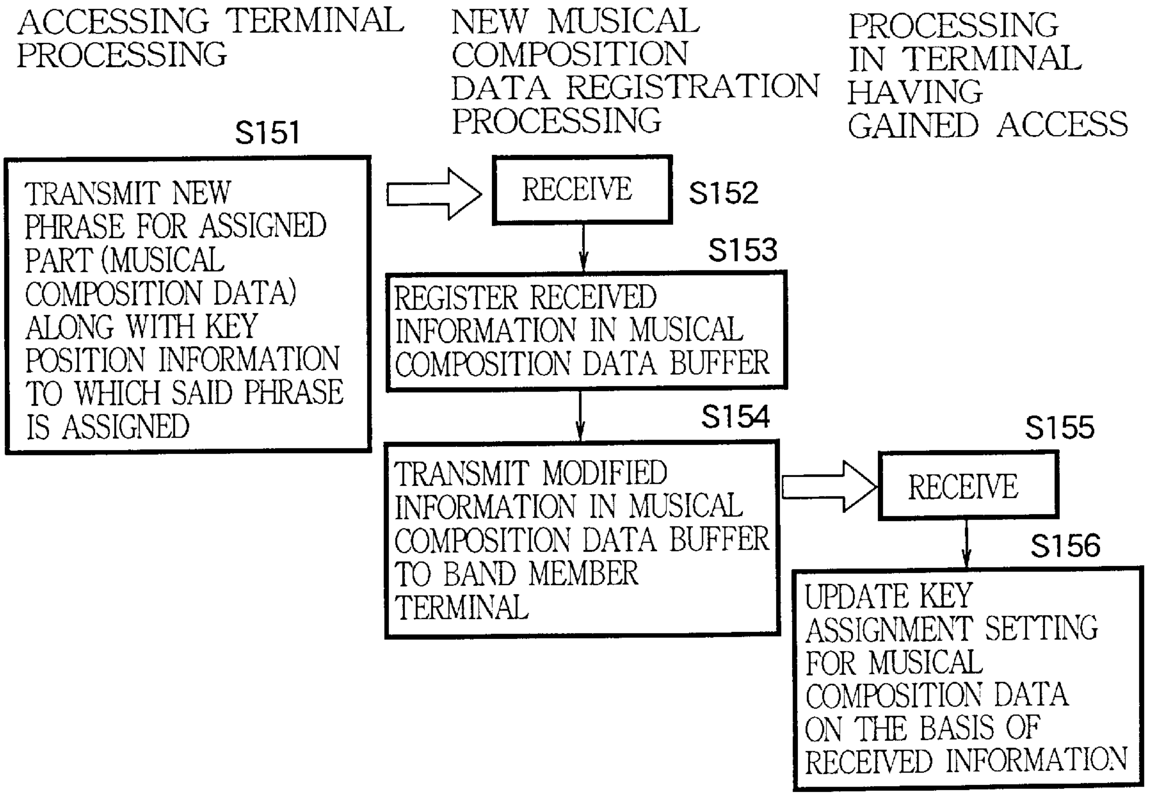
FIG. 11 is a flowchart of new phrase performance information registration processing in an embodiment of a network performance system according to the present invention.
Figure 12:
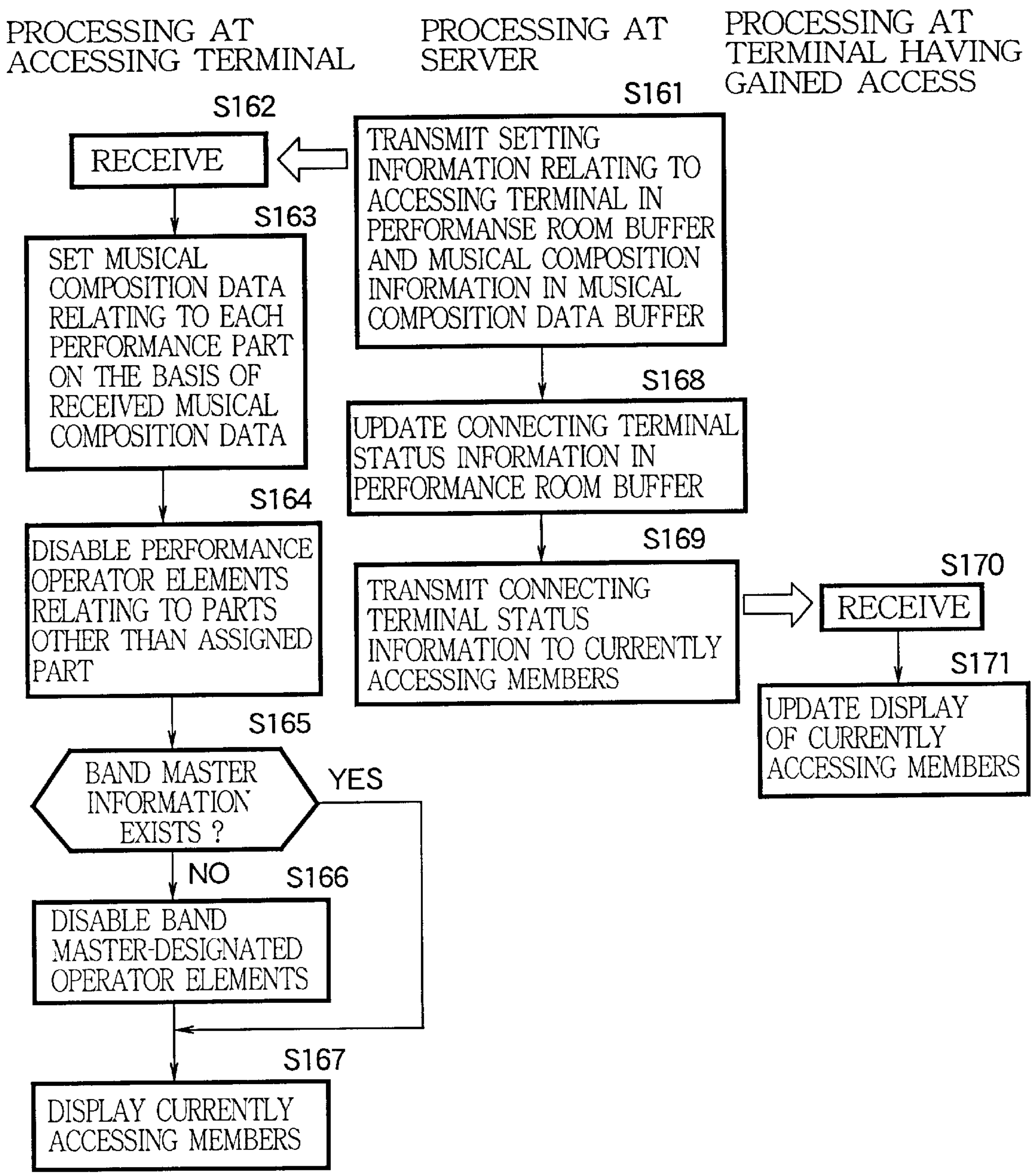
FIG. 12 is a flowchart of initial setting processing in an embodiment of a network performance system according to the present invention.

FIG. 10 to FIG. 12 are flowcharts of initial setting processing. At terminal B (band member) 25, the operator elements or keys designated to the band master in the performance executing program are disabled. Each member is able to perform the part assigned to him or her. By disabling the part performance operator elements for parts other than their own assigned part, a user is prevented from becoming involved in performing a part other than his or her own assigned part, thereby enabling a band session approximating a real session to be enjoyed. Musical composition data for band performance recorded in the phrase performance information buffer for each performance room is set in each accessing terminal. Even if a band member joins the performance room during a session, the phrase performance information currently being used in the band session can still be set accurately by the performance executing program of that member's terminal.

By implementing new phrase performance information registration processing, it is possible to carry out a band performance using phrase performance information which differs from the preset phrase performance information. Each terminal is capable of modifying or editing only the phrase performance information relating to the part assigned to that terminal. New musical composition data is recorded into the room 1 buffer 30 or room 2 buffer 31, which are provided for each performance room on the server 23, and the information in the buffer is erased when use of a performance room is terminated. By transmitting the phrase performance information in the phrase performance information buffer to the terminal of each band member, the same phrase performance information will be set in the terminals of all the band members.

FIG. 10 is a flowchart of initial setting processing for the server. This processing is carried out only when access is made by terminal A (band master) 22. At step S141, the information in the database 28 for the band using a performance room and the information in the reservation status database 29 is registered in the buffer 30 for room 1 or the buffer 31 for room 2. The information thus registered comprises: the address and user ID information relating to terminal A (band master) 22, the address and user ID information relating to terminal B (band member), information relating to the parts assigned to each member, information indicating the current status of accessing terminals (members), performance room reservation time information, and the like.

At step S142, the information recorded in the phrase performance information buffer in buffer 30 for room 1 or buffer 31 for room 2 is reset and initialized. If there is no information stored in the phrase performance information buffer in buffer 30 or 31, then preset phrase performance information previously installed in each terminal is used. If the phrase performance information used has been modified or edited, then new phrase performance information for each part is stored in the phrase performance information buffer.

FIG. 11 is a flowchart of new phrase performance information registration processing. This is carried out only when an accessing terminal wishes to register new phrase performance information. At step S151, phrase performance information for a new phrase for the assigned part is transmitted to the server 22, along with information on the key position to which this phrase is allocated. The new phrase performance information contains data created by the user him or herself, data downloaded from the network, or the like. At step S152, the server receives the phrase performance information and associated key position information, at step S153, the received information is registered in the phrase performance information buffer, and at step S154, the modified information in the phrase performance information buffer is transmitted to the terminals of the other band members. A terminal which has already accessed the performance room receives this information at step S155 and modifies its key assignment settings on the basis of the received information.

FIG. 12 is a flowchart of initial setting processing on the terminal side. The server 23 firstly carries out processing for the accessing terminal. At step S161, the server 23 transmits setting information relating to the accessing terminal stored in the performance room buffer in the buffer 30 for room 1 or the buffer 31 for room 2, and phrase performance information stored in the phrase performance information buffer in the buffer 30 for room 1 or the buffer 31 for room 2 to the terminals which have gained access, and it then proceeds to step S168. The setting information comprises information indicating whether or not the accessing terminal is the band master, information relating to the part assigned to the accessing terminal, and information relating to the band members who have currently gained access, and the like. At step S162 on the terminal side, the accessing terminal receives the information from the server, and it then sets phrase performance information relating to each performance part on the basis of the phrase performance information received at step S163. As a result, the network band performance program is started up at the terminal, and a performance preparation screen is displayed.

Figure 22:
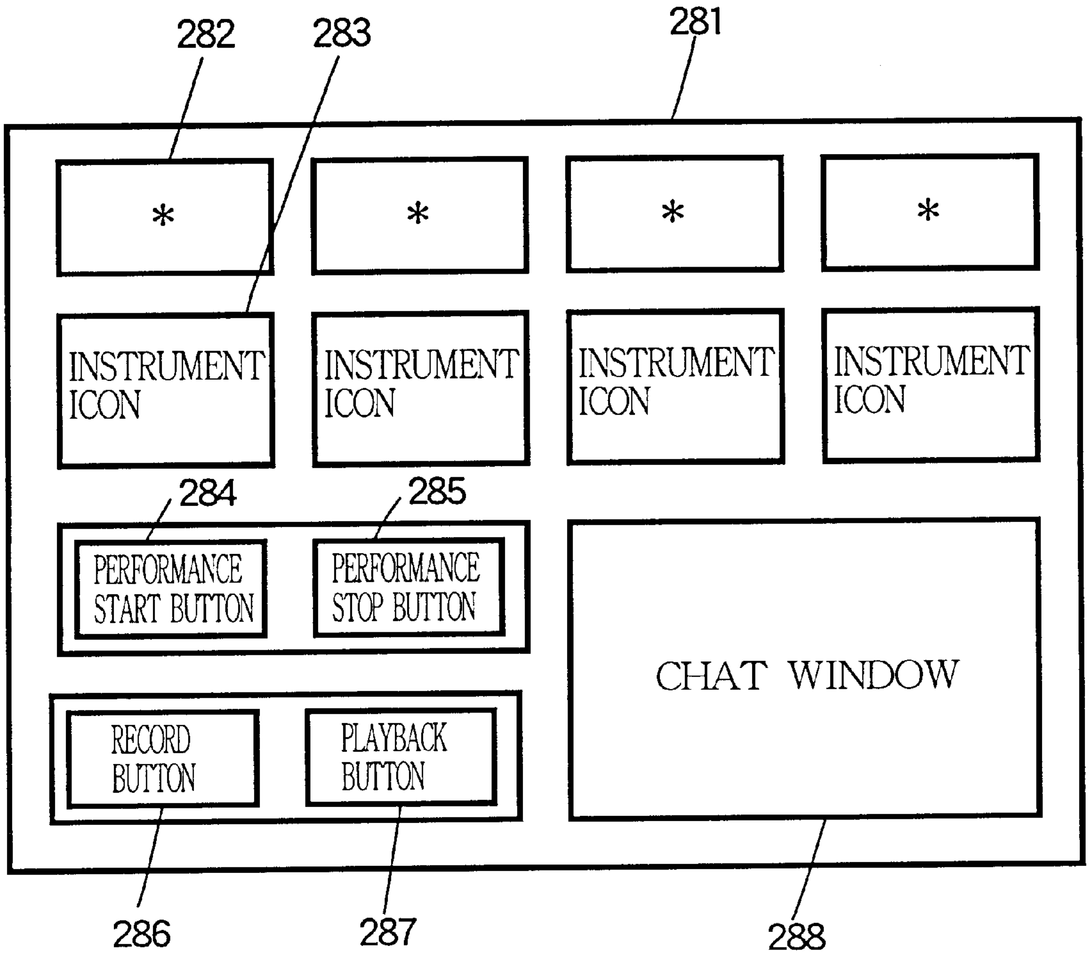
FIG. 22 is an illustrative diagram of a performance preparation screen in an embodiment of a network performance apparatus according to the present invention.

FIG. 22 is an illustrative diagram of a performance preparation screen. In the upper portion of the performance preparation screen 281, a member name 282 and assigned instrument icon 283 are displayed for each performance part, and in the lower left-hand region of the screen, a performance start button 284, performance stop button 285, record button 286 and replay button 287 are displayed. The lower right-hand region of the screen shows a chat window 288.

Phrase performance information used in the performance is assigned to each of the keys. In specific terms, the key assignment table 41 shown in FIG. 3, or the like, is downloaded to the memory region of the terminal. If there is no information stored in the phrase performance information buffer within the buffer 30 for room 1 or the buffer 31 for room 2, in which the performance is being conducted, then preset phrase performance information is allocated. At step S164, the performance operator elements relating to parts other than the assigned part are disabled. Specifically, if a performance screen is displayed as described hereinafter with reference to FIG. 23, then, for example, only the performance operator elements of the part assigned to that terminal are displayed, and furthermore, any operation of keys corresponding to parts other than the assigned part is ignored.

At step S165, it is determined whether or not there is band master information, and if there is band master information, the processing moves on to step S167, whereas if there is no band master information, the processing moves to step S166. At step S166, the band master-designated operator elements are disabled, the display of the band master-designated operator elements is turned off, and the processing then proceeds to step S167. The band master-designated operator elements comprise a performance start command operator, a performance recording operator, and a part assignment modification operator.

On the performance preparation screen 281 shown in FIG. 22, there is a display region corresponding to the aforementioned operator elements, wherein the performance start command operator element corresponds to the performance start button 284, the performance stop command operator corresponds to the performance stop button 285, the performance recording operator 286 corresponds to the record button 286, and the performance playback operator corresponds to the playback button 287. If a part assignment modification operator element is provided, then this can be made to correspond to the assigned instrument icons 283. If the user clicks the mouse pointer on the aforementioned display region, this has a similar function to pressing the corresponding operator element. If an operator element is disabled, then the corresponding display region is not displayed, or the corresponding region is displayed in a faint colour, such that the user can recognize that it cannot be used.

At step S167, the members currently granted access are displayed. The member names 282 are displayed in frames above the assigned instrument icons 283 on the performance preparation screen. On the other hand, at step S168, the server 23 modifies the connected terminal status information in the performance room buffer contained in the buffer for the room being used for the performance, namely, either the buffer 30 for room 1 or the buffer 31 for room 2. Specifically, the member name, user ID, and assigned part name relating to the newly accessing terminal are registered. At step S169, the server 23 transmits the connected terminal status information to the currently accessing members. An accessing terminal receives the connected terminal status information from the server 23 at step S170, and at step S171, it modifies its display of the currently accessing members. In other words, a member name 282 is displayed in a frame above an assigned instrument icon 283 on the performance preparation screen 281. Thereupon, the sequence moves to the following performance room use processing.

Figure 13:
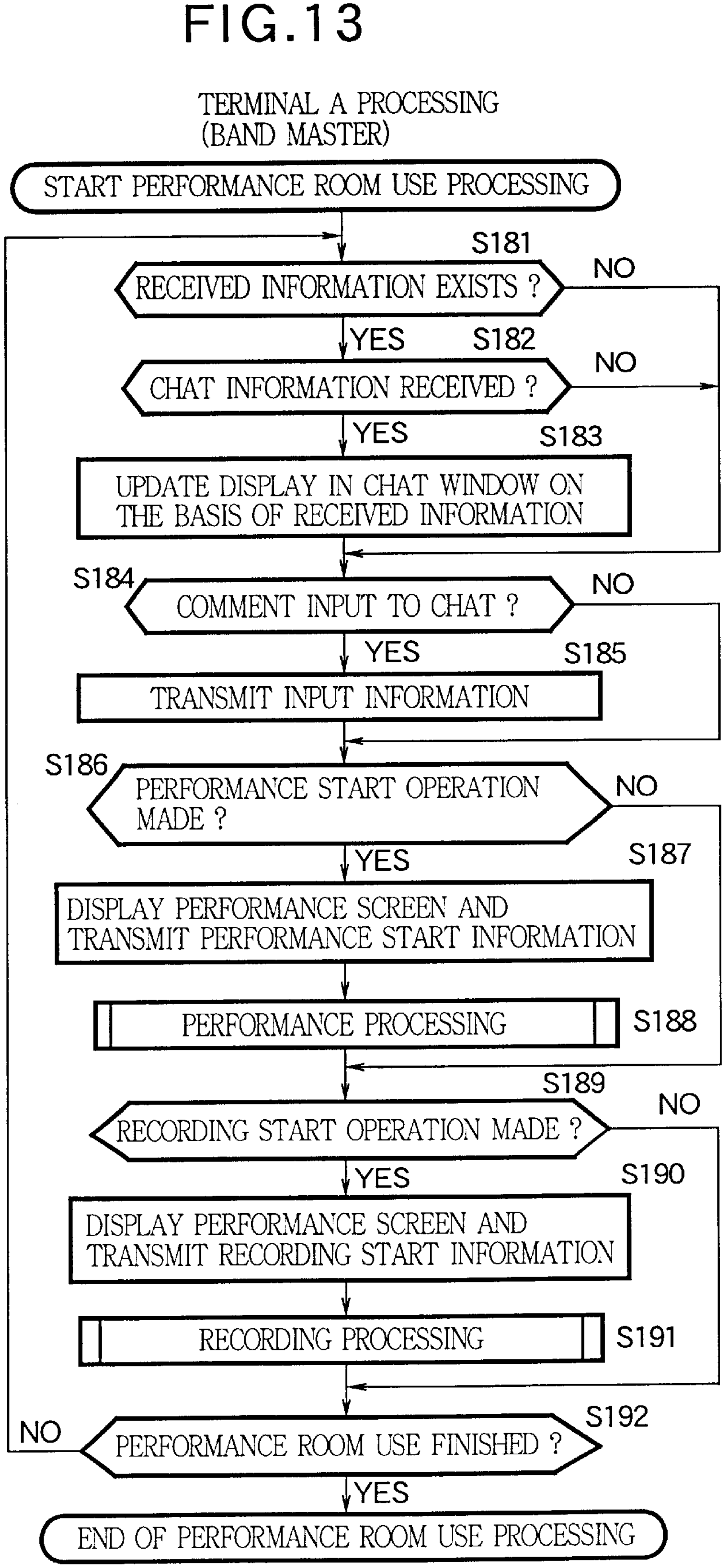
FIG. 13 is a flowchart of performance room use processing at terminal A (band master) in an embodiment of a network performance system according to the present invention.
Figure 14:
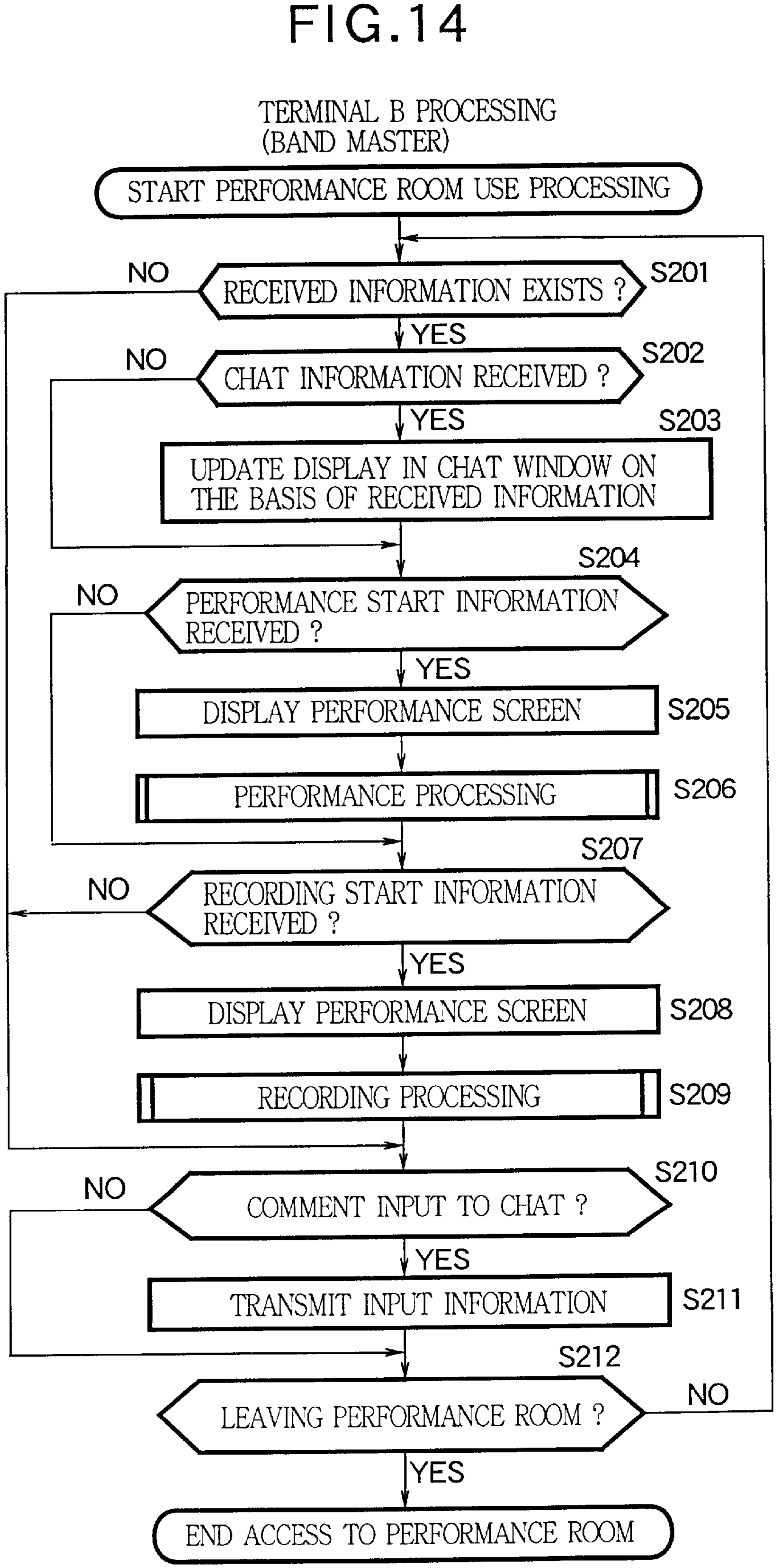
FIG. 14 is a flowchart of performance room use processing in an embodiment of a network performance system according to the present invention.

FIG. 13 and FIG. 14 are flowcharts of performance room use processing. FIG. 13 is a flowchart of performance room use processing at the terminal A (band master) 22. FIG. 14 is a flowchart of performance room use processing at terminal B (band member) 24. Performance room use processing involves various setting processes prior to performance, using the performance preparation screen 281 illustrated in FIG. 22, for example, implementing a performance start command, a recording start command, processing communication of comments, and the like. It is possible for the band members to exchange messages in real time using the chat window provided on the performance preparation screen 281. The processes of starting a performance, starting recording and modifying assigned parts can only be carried out by terminal A (band master) 22. The server 23 transmits information received from terminal A (band master) 22 or terminal B (band member) 24 to the member terminals other than the transmitting terminal.

At step S181, which is implemented at the terminal A (band master) 22 illustrated in FIG. 13, when information has been received, the processing moves to step S182 and when no information has been received, the processing moves to step S184. At step S183, the display in the chat window on the performance preparation screen 281 shown in FIG. 22 is modified on the basis of the received information, and then the processing moves to step S184. At step S184, it is determined whether or not any comments have been input to the chat window 288 at the terminal in question, and if so, the input information is transmitted, whilst if not, the processing moves to step S186. In FIG. 22, the chat window 288 is depicted as a single area, but it can be split into two windows, for sending and receiving (reception log) by means of simple processing.

At step S185, the input information is transmitted to the server 23. The server 23 then sends this information to the member terminals other than the terminal transmitting the information. This transmission and reception of comments can be carried out using conventionally known chat software. At step S186, it is determined whether or not there has been a performance start operation, by detecting whether the performance start button 284 on the performance preparation screen 281 in FIG. 22 has been clicked, or alternatively, whether the corresponding performance start operator element has been engaged. If a performance start instruction has been given, the processing moves to step S187, and if no performance start instruction has been given, the processing moves to step S189. At step S187, a performance screen is displayed and performance start information is transmitted to the server 23, whereupon processing moves to step S188.

Figure 23:
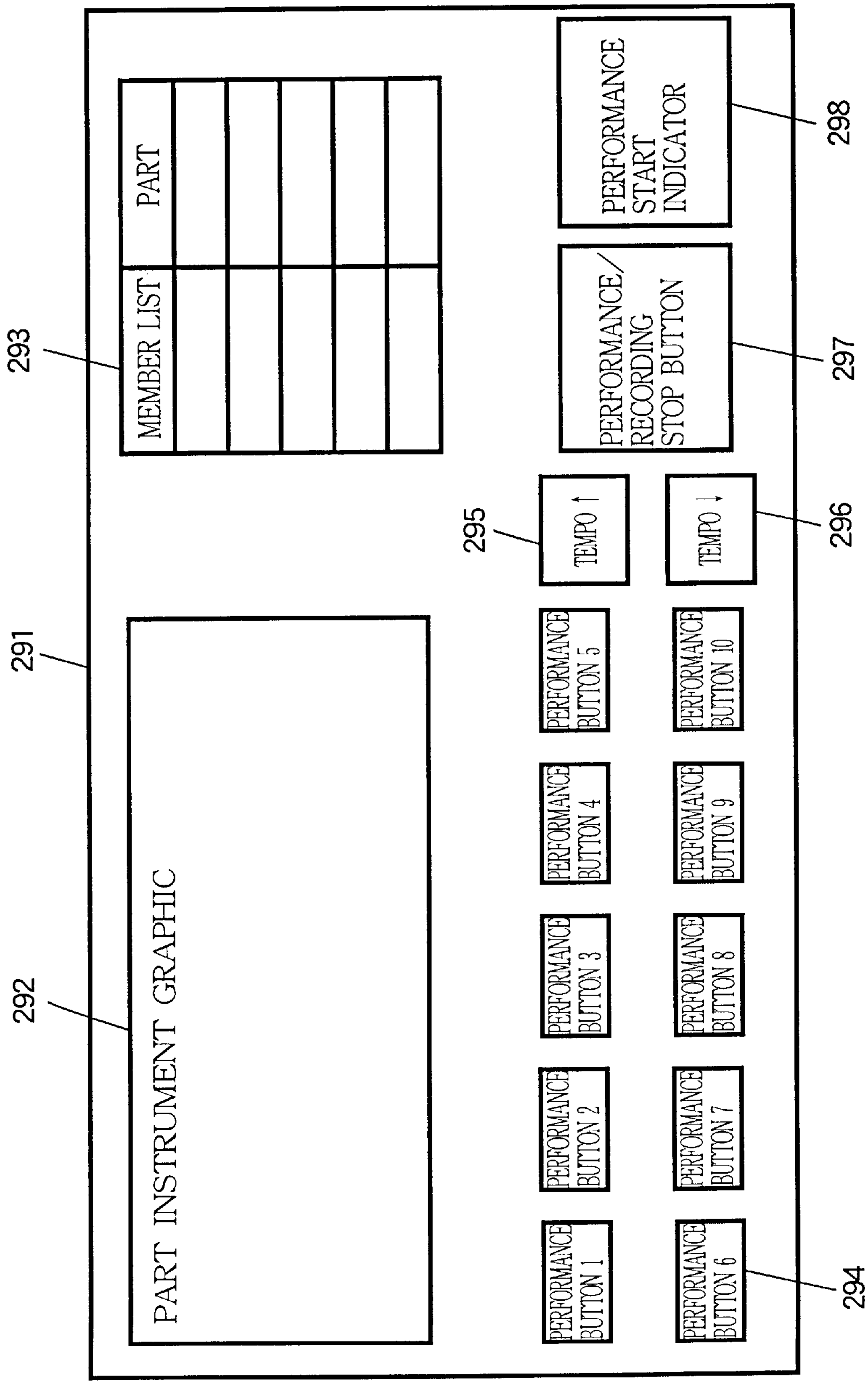
FIG. 23 is an illustrative diagram of a performance screen in an embodiment of a network performance apparatus according to the present invention.

FIG. 23 is an illustrative diagram of a performance screen. At the top left of the performance screen 291, a part instrument graphic 292 is displayed, and at the top right of the screen, a list of members and their corresponding assigned parts 293 is displayed. In the bottom left of the screen, a plurality of performance buttons 294 are displayed, and to their right, a tempo up switch 295 and a tempo down switch 296 are shown. Further to their right, a performance/recording stop button 297 and a performance start indicator 298 are displayed. The performance indicator 298 is a region containing a display which indicates that a performance is in progress.

At step S188, performance processing is carried out, as described hereinafter with reference to FIG. 15, and the processing then moves to step S189. At step S189, it is determined whether or not there has been a recording start operation, by detecting whether the performance record button 286 on the performance preparation screen 281 in FIG. 22 has been clicked, or alternatively, whether the corresponding performance recording operator element has been engaged. If a performance start instruction has been given, the processing moves to step S190, and if no such instruction has been given, the processing moves to step S192. At step S190, the performance screen 291 illustrated in FIG. 23 is displayed, and recording start information is transmitted to the server, whereupon the processing moves to step S191. At step S191, recording processing is carried out, as described hereinafter with reference to FIG. 15, and the processing then moves to step S192.

At step S192, it is determined whether or not the use of the performance room has ended, and if its use has ended, then the present performance room use processing is terminated, whilst if no end of use is detected, the processing moves to step S181. Cases where it is judged that the use of the performance room has ended include cases where the performance stop button 285 on the performance preparation screen 281 in FIG. 22 has been clicked on, or alternatively, the key operator element corresponding to this has been engaged, or cases where the reservation time has ended, or the like. When the performance/recording stop button 297 on the performance screen 291 illustrated in FIG. 23 is clicked, or when the corresponding key operator element is engaged, the display returns to the performance preparation screen 281 in FIG. 22.

At terminal B (band member) 24, as illustrated in FIG. 14, it is determined whether or not information has been received from the server 23, and if information has been received, the processing moves to step S201, whilst if no information has been received, the processing moves to step S210. At step S201, it is determined whether or not chat information has been received, and if chat information has been received, the processing moves to step S202, whilst if no chat information has been received, the processing moves to step S204. At step S203, the display in the chat window 288 of the performance preparation screen 281 in FIG. 22 is modified or updated on the basis of the received information, whereupon the processing moves to step S204. At step S204, it is determined whether or not performance start information has been received, and if such information has been received, the processing moves to step S205, whilst if it has not been received, the processing moves to step S207. At step S205, the performance screen 291 shown in FIG. 23 is displayed, whereupon the processing moves on to step S206 to carry out performance processing, as described hereinafter with reference to FIG. 15.

At step S207, it is determined whether or not recording start information has been received, and if such information has been received, the processing moves to step S208, whilst if it has not been received, the processing moves to step S210. At step S208, the performance screen 291 in FIG. 23 is displayed, and at step S209, recording processing is carried out, as described hereinafter with reference to FIG. 15, whereupon the processing moves to step S210. At step S210, it is determined whether or not there has been any input of comments from the home terminal to the chat window 288 of the performance preparation screen 281 in FIG. 22, and if there has been such input, the input information is sent to the server, whilst if there has been no such input, the processing moves to step S212.

At step S212, it is determined whether or not the user is leaving the performance room, and if the user is leaving, the access of that terminal to the performance room is terminated. It is judged that the user is to leave the performance room when the performance stop button 285 on the performance preparation screen 281 in FIG. 22 has been clicked, or when the key operator element corresponding to this has been engaged. If the performance/recording stop button 297 on the performance screen 291 shown in FIG. 23 is clicked or if the corresponding key operator element is engaged, then the display returns to the performance preparation screen 281 in FIG. 22. Terminal B (band member) is not capable of ending the use of the performance room.

Figure 15:
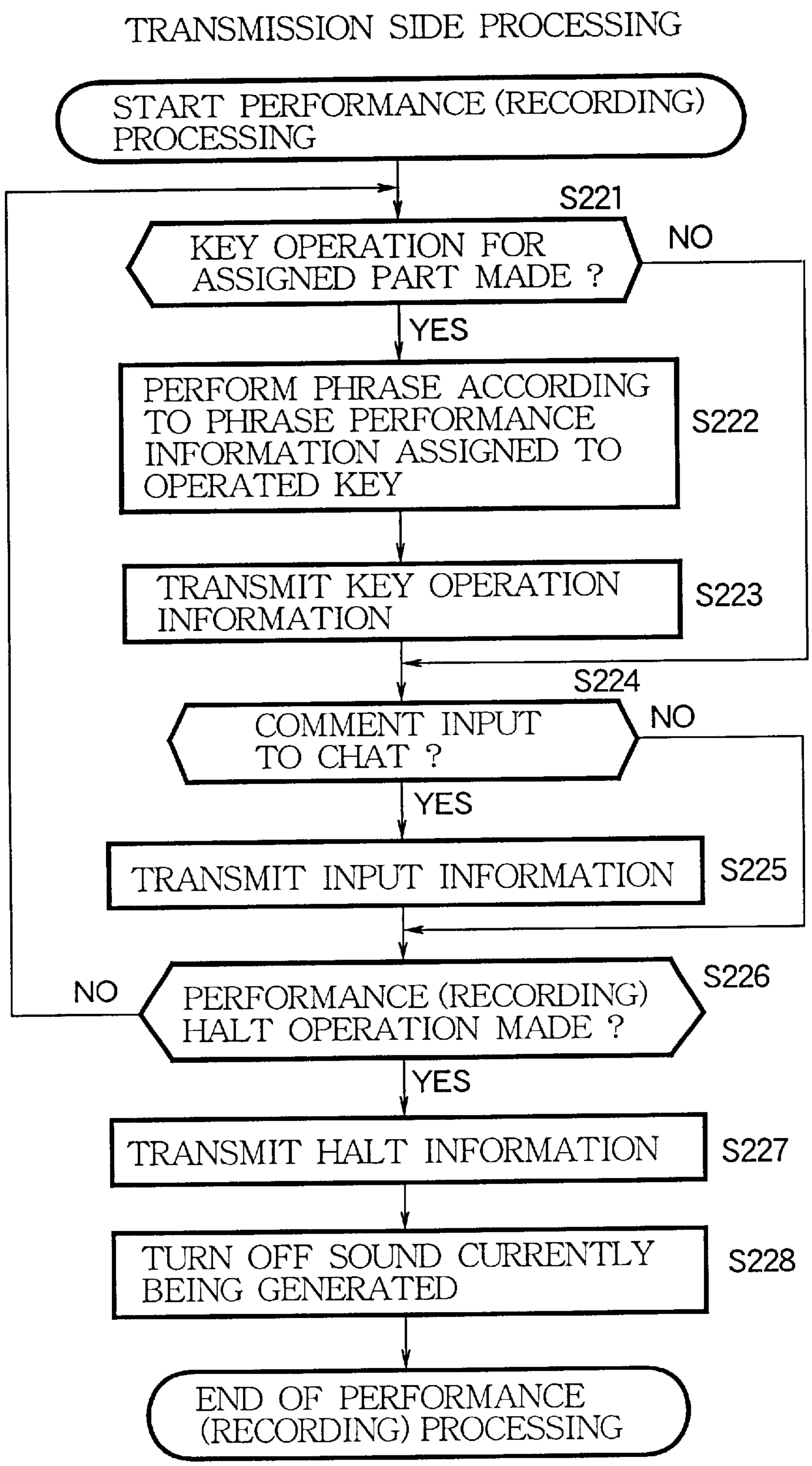
FIG. 15 is a flowchart of performance processing or recording processing at a transmitting side in an embodiment of a network performance system according to the present invention.
Figure 16:
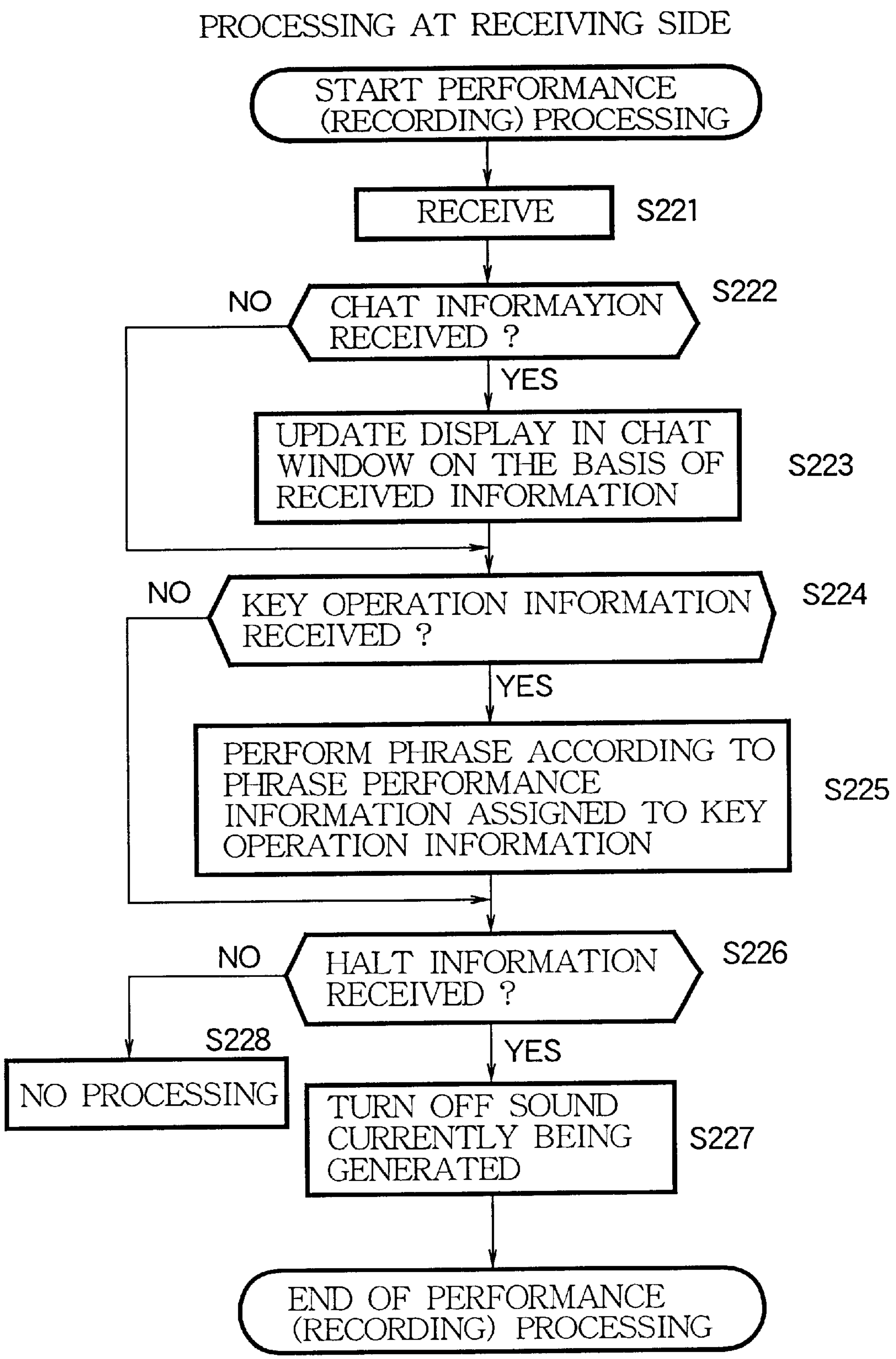
FIG. 16 is a flowchart of performance processing or recording processing at a receiving side in an embodiment of a network performance system according to the present invention.

FIG. 15 and FIG. 16 are flowcharts of the steps involved in the performance processing and recording processing shown in FIG. 13 and FIG. 14. FIG. 15 is a flowchart of performance processing or recording processing on the transmitting side. FIG. 16 is a flowchart of performance processing or recording processing on the receiving side.

Performance processing and recording processing involve processes for implementing band performance and band performance recording by means of the performance screen 23 shown in FIG. 23. The difference between performance processing and recording processing simply relates to whether or not the band performance is stored at each terminal. In performance recording, key information input by the terminals of all the members is stored sequentially along with the assigned part for each member, in accordance with the progression of the series of phase performances. Therefore, the following description will concentrate principally on performance processing which does not involve recording. By clicking on one of the plurality of performance buttons 294 on the performance screen 23 using a mouse, or the like, phrase performance information allocated to the clicked performance button 294 will be generated as sound by the terminal. The performance buttons 294 correspond to the various key operator elements on a keyboard, and if the corresponding key operator element is depressed, the allocated phrase performance information will be reproduced by means of the same processing. At the same time, operational information indicating the key position of the key operator element corresponding to the performance button 294 is transmitted. In performance (recording) processing, the server carries out processing for transmitting the information thus received to the terminals of the other band members. If new phrase selection information is generated during phrase performance by inputting new key operations for the same performance part, then the performance part will switch at that point. The timing of this switching may be the timing of a prescribed beat or bar, or it may be the end timing of a phrase during reproduction. Moreover, this timing may be devised such that it is dependent on the settings at each terminal, or alternatively, the switching timing may be set independently for each performance part. In cases where the switching timing is set independently for each performance part, the switching timing of each performance part is set by the member to which that part is assigned, and compatibility between the members' terminals can be maintained if, in the aforementioned new phrase performance information registration processing, this information is stored in the musical composition buffer, along with the phrase performance information for a new phrase, and transmitted to the terminal of each member.

In performance processing or recording processing on the transmitting side illustrated in FIG. 15, at step S221, it is determined whether or not there has been a key operation for the assigned part, and if there has been a key operation for the assigned part, the processing moves to step S222, whereas if there has been no such operation, the processing moves to step S224. In step S221, the process of judging whether there has been a key operation may involve detecting only key-on events when a key is depressed, or it may be premised on detection of key-off events when a key is released, also. At step S222, a phrase performance is carried out in accordance with the phrase performance information allocated to the key which has been operated, whereupon the processing moves to step S223. In this process, if a phrase performance is currently in progress and there is a new key-on event for an operating key, and the performance part relating to the newly operated key is the same as the performance part relating to the phrase currently being performed, then the phrase performance information currently being reproduced is changed to the phrase performance information allocated to this new operating key.

If the prescribed performance time period for the phrase performance information being performed ends and there is no key-on event, the performance of the phrase is stopped. However, if a system based on detecting key-off events also is being used and if such a key-off event is detected, then it is possible for the performance of the phrase currently being reproduced to be stopped. Moreover, in cases where phrase performance information has been set such that a looped performance is obtained, the performance of the phrase currently being reproduced can only be stopped by a key-off operation.

At step S223, the operation detected at step S221 is transmitted as key operational information to the server 23. At step S222, in cases where phrase performance is controlled by detecting key-off events, even if there has been a key-off event, the key operational information is still transmitted to the server, with the attachment of separate operational information indicating that there has been a key-off event. At step S224, it is determined whether or not there has been input of comments to the chat function, and if there has been such input, the processing moves to step S225, whilst if there has been no such input, the processing moves to step S226. At step S225, the input information is transmitted, whereupon processing moves to step S226.

The performance screen in FIG. 23 is not provided with a display region for a chat window, but by clicking on a prescribed region of the performance screen, it is possible to open up a chat window on the performance screen. At step S226, it is determined whether or not there has been a performance (recording) halt operation, and if such a halt operation has been made, the processing moves to step S227, whilst if no such operation has been made, the processing returns to step S221. A halt operation is determined by detecting whether the performance/recording stop button on the performance screen 291 in FIG. 23 has been clicked, or whether the corresponding key operator element has been pressed. At step S227, the halt information is transmitted to the server, at step S228, the musical sound being generated is erased, and the performance (recording) processing ends. The display screen returns to the performance preparation screen 281 in FIG. 22.

At the receiving side illustrated in FIG. 16, key operational information is received from the other terminals at step S221. At step S222, it is determined whether or not chat information has been received, and if chat information has been received, the processing moves to step S223, whereas if no chat information has been received, the processing moves to step S224. At step S223, the display in the chat window is updated on the basis of the received information. The chat window may be previously opened on the performance screen, similarly to the transmitting side, or it may be opened automatically when chat information is received. At step S224, it is determined whether or not key operational information has been received, and if it has been received, the processing moves to step S225, and if it has not been received, the processing moves to step S226.

At step S225, a phrase performance is implemented in accordance with phrase performance information allocated to the key operational information, whereupon the processing moves to step S226. In this step, if a phrase performance is currently in progress and new key operational information is received, and the performance part relating to this key operational information is the same as the performance part relating to the phrase currently being performed, then the musical composition data currently being reproduced is changed to the phrase performance information allocated to the new key operational information.

In cases where phrases are reproduced on the basis of detecting key-off events at step S222 in FIG. 15, then at this step on the receiving side also, if the key operational information is detected to be a key-off event, then the phrase performance of the phrase performance information allocated to this key operational information is halted. Moreover, the timing at which a phrase being performed is halted on the basis of an off event in the received key operational information and the timing at which phrase performance information is modified, when the performance part relating to received key operational information is the same as the performance part relating to phrase performance information currently being performed, are dependent on the switching timing settings in the terminal on the receiving side.

At step S226, it is determined whether or not halt information has been received, and if halt information has been received, the processing moves to step S227, whilst if halt information has not been received, the processing moves to step S228. At step S227, the musical sounds currently being generated are turned off, and performance (recording) processing ends. At step S228, processing at the reception side is ended.

In the foregoing, no description was given for the operation of the tempo up switch 295 and the tempo down switch 296 on the performance screen 291 in FIG. 23. By clicking on one of these display regions, or by pressing a corresponding key operator element on the keyboard, it is possible to alter the tempo of the phrase performances of the performance part at the home terminal. At the same time, the operational information for the key operator elements allocated to the tempo up switch 295 and the tempo down switch 296 are transmitted to the other terminals via the server, so that the tempo of this performance part can be altered at the other terminals also. As a method for altering the tempo value by operating the tempo up switch 295 or the tempo down switch 296, for example, an input tempo value can be set in the home terminal by entering a new tempo value in figures in a text box and operating a confirmation switch, or the like, whilst simultaneously transmitting this tempo value to the other terminals such that the tempo of the other terminals is set to the same value.

With regard to the operational information, in the foregoing description, the performance part is associated to the operational information, but if it is possible to identify the transmitting terminal for the receiving side when the operational information is received, then it is not necessary to allocate the performance parts to individual items of operational information. In this case, all of the key operator elements and operational information relating thereto can be used for each performance part. The part is identified in terms of the name of the transmitting node.

With regard to performance band registration, in the foregoing description, any one terminal was only able to become master of one band, but it is also possible to allow a terminal to become band master of a plurality of performance bands. With regard to performance room reservations, a system was adopted whereby the task of making a reservation for a performance room was restricted to the band master, but it is also possible to allow other band members to make reservations. Moreover, no restriction was placed on the number of performance bands which are able to make reservations, but it is possible to impose restrictions, for example, to the effect that bands which do not comprise a certain number of members or more are not able to reserve performance rooms, or the like.

With regard to access to performance rooms, in the foregoing description, a performance room could not be used unless it was accessed by the band master, but it is also possible to adopt a system whereby the performance room can be used by any member provided that any member of a band gains access. In this case, it should be confirmed that use of the performance room is permitted by means of information, such as the user ID, band name, or the like, relating to the accessing terminal. Furthermore, above, it was only possible for the band members to gain access to the performance room, but it is also possible for access to the performance room to be granted to terminals other than the band members, by means of settings made by the band master or band members. In this case, if the accessing terminals which do not belong to band members are allowed only to listen to the performance in the performance room which they have accessed, then there is no risk that they will interfere with the performance given by the band members.

With regard to the phrase performance information buffers, in the foregoing description, a system was adopted whereby performance room use status information and the information in the phrase performance information buffer used in the performance room was erased when the use of the performance room was ended, but it is also possible for this information to be stored in the band database such that it corresponds to the performance band which used the performance room. The decision as to whether to conduct this storage processing may be set as an item which can be selected by the band master or the other members.

With regard to initial setting processing, in the foregoing description, new musical composition data registration processing was implemented, but it is also possible to allow new phrase performance information registration processing to be carried out during use of a performance room. With regard to performance room use processing, in the foregoing description, a method was adopted whereby the parts assigned to the band members could only be set during registration of band members, but besides this, it is also possible, for example, to allow the assigned parts to be changed freely by changing the user name display on the performance preparation screen during performance room use processing. Here, a method may also be adopted whereby the assigned parts can only be set by the band master.

In the foregoing description, a server was provided on a network, with each terminal forming a client, but if the functions of the server described above can be combined in one of the terminals, then it is possible to dispense with the server on the network.

In the foregoing description, the processing was executed by means of plug-in format application software which is installed along with web browser application software in a generic personal computer. However, the software does not have to be a plug-in format, and furthermore, it is also possible to execute the processing using a specialized computer, rather than using application software.

The foregoing description was premised on the use of generic personal computers as the terminals, but these terminals may also be constituted by electronic instruments containing an integrated musical keyboard, sound generating circuit, automatic performance apparatus device, and the like, which connect to various networks, and the like, via the Internet.

As described above, the inventive performance apparatus 4 is assigned with one of a plurality of performance parts to execute a joint performance composed of the plurality of the performance parts in communication with other performance apparatus 2 through a network 1 (FIG. 1). The performance apparatus 4 comprises storing means 9 for storing performance information representing music contents of the plurality of the performance parts, input means 5 manually operable to input operational information effective to execute the performance part assigned to the performance apparatus 4, receiving means 7 for receiving operational information inputted by and transmitted from other performance apparatus 2 via the network 1, the received operational information being effective to execute other performance part assigned to other performance apparatus 2, and sound means 8 for reading out the performance information of the performance part assigned to the performance apparatus 4 from the storing means 9 in response to the operational information inputted by the input means 5, and for concurrently reading out the performance information of other performance part assigned to other performance apparatus 2 from the storing means 9 in response to the operational information received by the receiving means 7, thereby executing the joint performance composed of the plurality of the performance parts.

The performance apparatus 4 further comprises control means 6 operative when the operational information inputted by the input means 5 is adequately associated to the performance part assigned to the performance apparatus 4 for transmitting the inputted operational information to other performance apparatus 2 via the network 1 so as to execute the ensemble performance in other performance apparatus 2, and being operative when the inputted operational information is inadvertently associated to other performance part assigned to other performance apparatus 2 for prohibiting transmission of the inputted operational information, the control means 4 further controlling the sound means 8 to prohibit reproduction of the performance information of other performance part in response to the inputted operational information when the inputted operational information is inadvertently associated to other performance part assigned to other performance apparatus 2.

The performance apparatus 2 is designated as a master for initiating the joint performance and the performance apparatus 4 is designated as a member initiated by the master. The input means 5 has a first key manually operable to input the operational information and a second key allotted a special function and being manually operable to input command information effective to initiate the ensemble performance. The control means 6 is operative when the performance apparatus 2 is designated as the master for enabling the second key so as to input the command information and to transmit the inputted command information to other performance apparatus 4 via the network 1 to initiate the joint performance, and is operative when the performance apparatus 4 is designated as the member for disabling the second key so as to prohibit inputting of the command information.

Specifically, the input means 5 comprises a keyboard 57 (FIG. 7) having a set of keys, a part of which is allotted to the performance part and is manually operable to sequentially input the operational information, and other part of which is allotted to other performance part and is therefore left for use by other performance apparatus.

The storing means 9 stores the performance information in the form of a set of phrases of music contents of each performance part so that the phrases are sequentially read out in response to a sequence of the operational information to execute each performance part.

The inventive performance apparatus further comprises transmitter means for transmitting a message in the form of a text to execute a chat with other performance apparatus via the network during the course of the joint performance.

The inventive performance apparatus further comprises edit means for editing the performance information of the performance part assigned to the performance apparatus and for transmitting the edited performance information to other performance apparatus.

As the foregoing description reveals, the present invention provides an advantage in that a band performance comprising a plurality of parts can be carried out simply by a plurality of network performance apparatuses. It provides a further advantage in that the performance reproduced by each network performance apparatus can be made the same at each of the terminals of the network performance apparatuses. By transmitting and receiving operational information, an advantage is obtained in that the amount of information transmitted and received can be reduced, and delay in processing is eliminated. By allocating performance parts individually to a plurality of operator elements, an advantage is obtained in that the information transmitted by a user's own terminal and the information transmitted from the other network performance apparatuses can be set by means of a simple operation. Consequently, it becomes possible to ensure that the part assigned to a particular user is only affected by that user's performance operations, so that he or she can take part in a band performance without external interference in his or her own performance. By allocating particular functions to at least one of a plurality of operator elements, an advantage is obtained in that the settings can be standardized in all of the network performance apparatuses in a simple manner. Consequently, it is possible to standardize the music reproduced at each of the network performance apparatuses, thereby allowing the users to enjoy a band performance which approximates a live band performance.

What is claimed is:

1. A network performance system comprising: a plurality of performance apparatuses each storing phrase performance information of a plurality of performance parts and each being allocated with one of the performance parts to conduct an ensemble performance composed of the plurality of the performance parts, and a server apparatus connected to each of the performance apparatuses via a network, wherein each of the performance apparatuses is manually operable to input operational information relating to the performance part allocated thereto, and transmits the inputted operational information to the server apparatus via the network, wherein the server apparatus delivers the operational information transmitted by each of the performance apparatuses to other of the performance apparatuses via the network, and wherein each of the performance apparatuses receives the operational information relating to other performance parts allocated to other of the performance apparatuses from the server apparatus via the network, and reproduces the phrase performance information of the performance part allocated thereto in response to the inputted operational information and concurrently reproduces the phrase information of other performance parts allocated to other of the performance apparatuses in response to the received operational information to thereby conduct the ensemble performance composed of the plurality of the performance parts.

2. A performance apparatus being allocated with one of a plurality of performance parts and storing phrase performance information of the plurality of the performance parts to conduct an ensemble performance composed of the plurality of the performance parts in communication with other performance apparatus through a network, the performance apparatus comprising:

an input device that is manually operable to input operational information relating to the performance part allocated to the performance apparatus;

a receiver device that receives operational information being inputted by other performance apparatus and relating to other performance part allocated to other performance apparatus via the network; and a sound device that reproduces the phrase performance information of the performance part allocated to the performance apparatus in response to the inputted operational information and that concurrently reproduces the phrase information of other performance part allocated to other performance apparatus in response to the received operational information to thereby conduct the ensemble performance composed of the plurality of the performance parts.

3. A performance apparatus being allocated with one of a plurality of performance parts and storing phrase performance information of the plurality of the performance parts to conduct an ensemble performance composed of the plurality of the performance parts in communication with other performance apparatus through a network, the performance apparatus comprising:

an input device that is manually operable to input operational information;

a control device that operates when the inputted operational information is adequately relating to the allocated performance part for transmitting the inputted operational information to other performance apparatus via the network so as to conduct the ensemble performance in other performance apparatus, and that operates when the inputted operational information is inadvertently relating to other performance part allocated to other performance apparatus for prohibiting transmission of the inputted operational information; and a sound device that reproduces the phrase performance information of the allocated performance part in response to the inputted operational information when the inputted operational information is adequately relating to the allocated performance part, the sound device prohibiting reproduction of the phrase performance information when the inputted operational information is inadvertently relating to other performance part allocated to other performance apparatus.

4. A performance apparatus designated as either of a master and a member and being allocated with one of a plurality of performance parts to conduct an ensemble performance in communication via a network with other performance apparatus allocated with other of the plurality of the performance parts under initiative by the master, the performance apparatus comprising:

an input device that has a first operator manually operable to input operational information effective to execute the allocated performance part, and a second operator assigned with a special function and being manually operable to input information effective to initiate the ensemble performance; and a control device that operates when the performance apparatus is designated as the master for enabling the second operator so as to input the command information and to transmit the inputted command information to other performance apparatus via the network to initiate other performance apparatus, and that operates when the performance apparatus is designated as the member for disabling the second operator so as to prohibit inputting of the command information.

5. A machine readable medium for use in a computer machine being allocated with one of a plurality of performance parts and storing phrase performance information of the plurality of the performance parts to conduct an ensemble performance composed of the plurality of the performance parts in communication with other computer machine through a network, the machine readable medium containing a program executable by the computer machine to carry out an ensemble performance process comprising the steps of:

inputting operational information relating to the performance part allocated to the computer machine;

receiving operational information being inputted by other computer machine and relating to other performance part allocated to other computer machine via the network;

reproducing the phrase performance information of the performance part allocated to the computer machine in response to the inputted operational information, and concurrently reproducing the phrase information of other performance part allocated to other computer machine in response to the received operational information to thereby conduct the ensemble performance composed of the plurality of the performance parts.

6. A machine readable medium for use in a computer machine being allocated with one of a plurality of performance parts and storing phrase performance information of the plurality of the performance parts to conduct an ensemble performance composed of the plurality of the performance parts in communication with other computer machine allocated with other performance part through a network, the machine readable medium containing a program executable by the computer machine for carrying out an ensemble performance process comprising the steps of:

inputting operational information;

transmitting the inputted operational information to other computer machine via the network when the inputted operational information is adequately relating to the allocated performance part so as to conduct the ensemble performance at other performance apparatus;

prohibiting transmission of the inputted operational information when the inputted operational information is inadvertently relating to other performance part allocated to other computer machine;

reproducing the phrase performance information of the allocated performance part in response to the inputted operational information when the inputted operational information is adequately relating to the allocated performance part in the ensemble performance at the computer machine; and prohibiting reproduction of the phrase performance information when the inputted operational information is inadvertently relating to other performance part allocated to other computer machine.

7. A machine readable medium for use in a computer machine designated as either of a master and a member and being allocated with one of a plurality of performance parts to conduct an ensemble performance in communication via a network with other computer machine allocated with other of the plurality of the performance parts under initiative by the master, the machine readable medium containing a program executable by the computer machine to carry out an ensemble performance process comprising the steps of:

configuring an input device to provide a first operator operable to input operational information effective to execute the allocated performance part and to provide a second operator allocated with a special function and being operable to input information effective to initiate the ensemble performance;

enabling the second operator when the computer machine is designated as the master so as to input the command information and so as to transmit the inputted command information to other computer machine via the network to initiate other computer machine; and disabling the second operator when the computer machine is designated as the member so as to prohibit inputting of the command information.

8. A server apparatus connected via a network to a plurality of performance apparatuses each storing phrase performance information of a plurality of performance parts and each being allocated with one of the performance parts to conduct an ensemble performance composed of the plurality of the performance parts, the server apparatus comprising:

a receiver device that receives operational information from each of the performance apparatuses via the network, the operational information being inputted by each of the performance apparatuses and relating to the performance part allocated to each of the performance apparatuses; and a transmitter device that transmits the operational information inputted by each of the performance apparatuses to other of the performance apparatuses via the network, thereby enabling each of the performance apparatuses to receive the operational information relating to other performance part allocated to other of the performance apparatuses and to reproduce the phrase information of other performance part allocated to other of the performance apparatuses in response to the received operational information, while allowing each of the performance apparatuses to reproduce the phrase performance information of the performance part allocated to each performance apparatus in response to the inputted operational information to thereby conduct the ensemble performance composed of the plurality of the performance parts.

9. A performance apparatus being assigned with one of a plurality of performance parts to execute a joint performance composed of the plurality of the performance parts in communication with other performance apparatus through a network, the performance apparatus comprising:

storing means for storing performance information representing music contents of the plurality of the performance parts;

input means manually operable to input operational information effective to execute the performance part assigned to the performance apparatus;

receiving means for receiving operational information inputted by and transmitted from other performance apparatus via the network, the received operational information being effective to execute other performance part assigned to other performance apparatus; and sound means for reading out the performance information of the performance part assigned to the performance apparatus from the storing means in response to the operational information inputted by the input means, and for concurrently reading out the performance information of other performance part assigned to other performance apparatus from the storing means in response to the operational information received by the receiving means, thereby executing the joint performance composed of the plurality of the performance parts.

10. The performance apparatus according to claim 9, further comprising control means operative when the operational information inputted by the input means is adequately associated to the performance part assigned to the performance apparatus for transmitting the inputted operational information to other performance apparatus via the network so as to execute the ensemble performance in other performance apparatus, and being operative when the inputted operational information is inadvertently associated to other performance part assigned to other performance apparatus for prohibiting transmission of the inputted operational information, the control means further controlling the sound means to prohibit reproduction of the performance information of other performance part in response to the inputted operational information when the inputted operational information is inadvertently associated to other performance part assigned to other performance apparatus.

11. The performance apparatus according to claim 9, being designated as either of a master for initiating the joint performance and a member initiated by the master, wherein the input means has a first key manually operable to input the operational information and a second key allotted a special function and being manually operable to input command information effective to initiate the ensemble performance, the performance apparatus further comprising control means operative when the performance apparatus is designated as the master for enabling the second key so as to input the command information and to transmit the inputted command information to other performance apparatus via the network to initiate the joint performance, and being operative when the performance apparatus is designated as the member for disabling the second key so as to prohibit inputting of the command information.

12. The performance apparatus according to claim 9, wherein the input means comprises a keyboard having a set of keys, a part of which is allotted to the performance part and is manually operable to sequentially input the operational information, and other part of which is allotted to other performance part and is therefore left for use by other performance apparatus.

13. The performance apparatus according to claim 9, wherein the storing means stores the performance information in the form of a set of phrases of music contents for each performance part so that the phrases are sequentially read out in response to a sequence of the operational information to execute each performance part.

14. The performance apparatus according to claim 9, further comprising transmitter means for transmitting a message in the form of a text to execute a chat with other performance apparatus via the network during the course of the joint performance.

15. The performance apparatus according to claim 9, further comprising edit means for editing the performance information of the performance part assigned to the performance apparatus and for transmitting the edited performance information to other performance apparatus.

16. A method of executing a joint performance composed of at least a first performance part and a second performance part by means of a first performance apparatus assigned with the first performance part in communication with a second performance apparatus assigned with the second performance part through a network, the method comprising the steps of:

storing performance information representing music contents of the first performance part and the second performance part in the first performance apparatus;

inputting first operational information effective to execute the first performance part by the first performance apparatus;

receiving second operational information inputted by and transmitted from the second performance apparatus via the network, the second operational information being effective to execute the second performance part assigned to the second performance apparatus;

reading out the first performance information of the first performance part assigned to the first performance apparatus in response to the first operational information inputted by the first performance apparatus; and concurrently reading out the second performance information of the second performance part assigned to the second performance apparatus in response to the second operational information received by the first performance apparatus, thereby executing the joint performance composed of the first performance part and the second performance part.

* * * * *